(12) United States Patent
Nakahata

(10) Patent No.: US 8,953,106 B2
(45) Date of Patent: Feb. 10, 2015

(54) DISPLAY UNIT, BARRIER DEVICE, AND METHOD OF DRIVING DISPLAY UNIT

(75) Inventor: Yuji Nakahata, Kanagawa (JP)

(73) Assignee: Sony Corporation, Tokyo (JP)

( * ) Notice: Subject to any disclaimer, the term of this patent is extended or adjusted under 35 U.S.C. 154(b) by 230 days.

(21) Appl. No.: 13/458,018

(22) Filed: Apr. 27, 2012

(65) Prior Publication Data

US 2012/0293500 A1    Nov. 22, 2012

(30) Foreign Application Priority Data

May 20, 2011    (JP) .................................. 2011-113894

(51) Int. Cl.
| | | |
|---|---|---|
| G02F 1/1335 | (2006.01) |
| G06F 3/038 | (2013.01) |
| G06T 15/00 | (2011.01) |
| G09G 3/36 | (2006.01) |
| G02F 1/1347 | (2006.01) |
| H04N 13/04 | (2006.01) |
| G09G 3/00 | (2006.01) |
| G09G 3/34 | (2006.01) |

(52) U.S. Cl.
CPC .......... *G02F 1/1347* (2013.01); *H04N 13/0413* (2013.01); *H04N 13/0415* (2013.01); *H04N 13/0454* (2013.01); *H04N 13/0497* (2013.01); *G09G 3/003* (2013.01); *G09G 3/3406* (2013.01); *G09G 3/3648* (2013.01); *G09G 2300/023* (2013.01); *G09G 2310/0251* (2013.01); *G09G 2320/0252* (2013.01); *G09G 2330/026* (2013.01)
USPC ............... 349/15; 345/208; 345/419; 345/94; 345/102

(58) Field of Classification Search
USPC ................ 349/15, 33, 36; 345/53–54, 94–96, 345/208–210, 419
See application file for complete search history.

(56) References Cited

U.S. PATENT DOCUMENTS

| | | | |
|---|---|---|---|
| 6,781,665 B2 | 8/2004 | Nakanishi et al. |
| 7,274,425 B2 | 9/2007 | Nakanishi et al. |
| 7,656,474 B2 | 2/2010 | Hanaoka et al. |
| 7,903,215 B2 | 3/2011 | Nakanishi et al. |
| 7,982,829 B2 | 7/2011 | Hanaoka et al. |
| 2002/0159018 A1* | 10/2002 | Kataoka et al. ................ 349/143 |
| 2003/0151703 A1 | 8/2003 | Nakanishi et al. |
| 2005/0001973 A1 | 1/2005 | Nakanishi et al. |

(Continued)

FOREIGN PATENT DOCUMENTS

| | | |
|---|---|---|
| JP | 2003-279946 A | 10/2003 |
| JP | 2006-330638 A | 12/2006 |
| JP | 2009-104105 A | 5/2009 |

*Primary Examiner* — Michael Caley
*Assistant Examiner* — Jia Pan
(74) *Attorney, Agent, or Firm* — SonyCorporation

(57) ABSTRACT

A display unit includes: a display section; a barrier section including a plurality of liquid crystal barriers switching an open state and a closed state; and a barrier driving section driving the barrier section with one or a plurality of barrier drive signals. Each of the barrier drive signals is a signal including a first waveform portion being configured of a series of waveforms allowing the liquid crystal barriers to be held in an open state over a plurality of frames, or a second waveform portion being configured of a series of waveforms to allowing the liquid crystal barriers to be switched between an open state and a closed state, and a third waveform portion being located just before the first or second waveform portion and having an average pulse height value smaller than a maximum value of a pulse height value of the first or second waveform portion.

20 Claims, 23 Drawing Sheets

(56) References Cited

U.S. PATENT DOCUMENTS

| | | |
|---|---|---|
| 2007/0103607 A1 | 5/2007 | Hanaoka et al. |
| 2007/0291207 A1 | 12/2007 | Nakanishi et al. |
| 2008/0136810 A1* | 6/2008 | Itakura et al. ............... 345/215 |
| 2009/0103177 A1 | 4/2009 | Jang et al. |
| 2009/0303166 A1* | 12/2009 | Tsubata ..................... 345/87 |
| 2010/0033642 A1* | 2/2010 | Kim .......................... 349/15 |
| 2010/0118233 A1 | 5/2010 | Hanaoka et al. |
| 2010/0149156 A1* | 6/2010 | Maki et al. ................. 345/211 |
| 2011/0234931 A1 | 9/2011 | Hanaoka et al. |

* cited by examiner

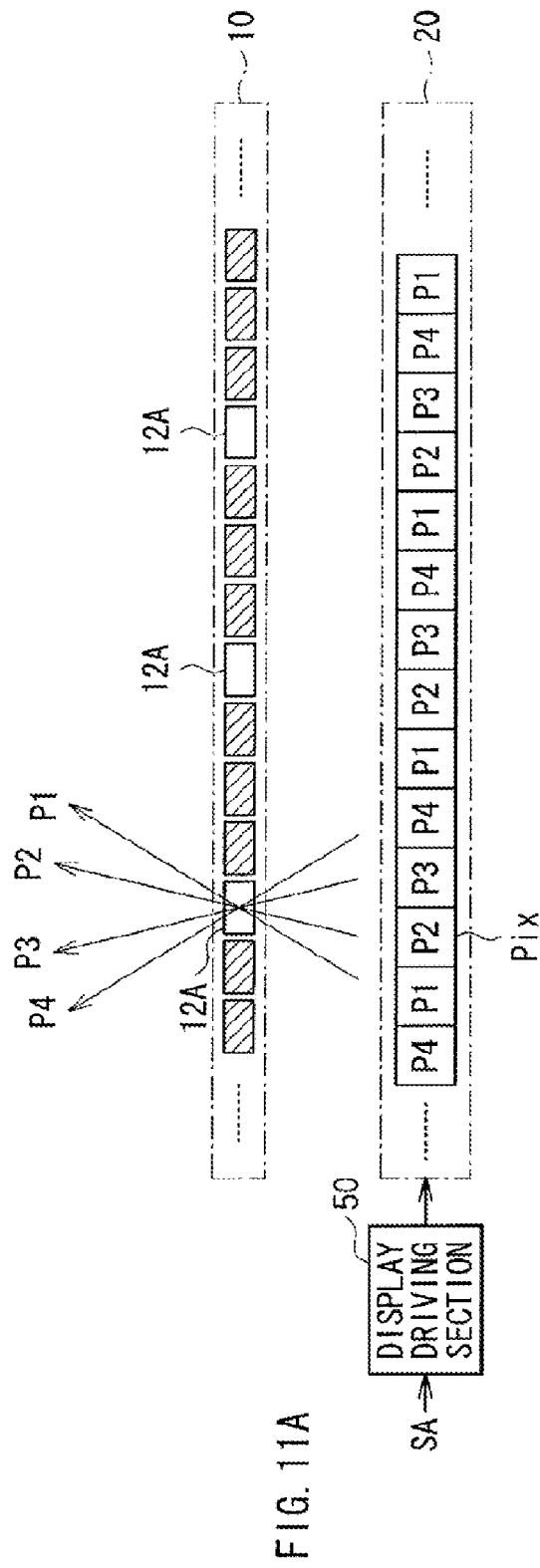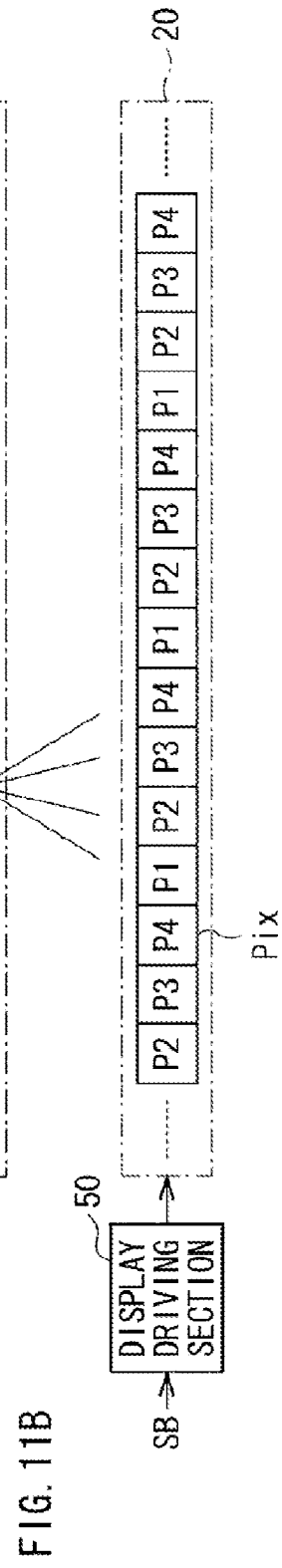

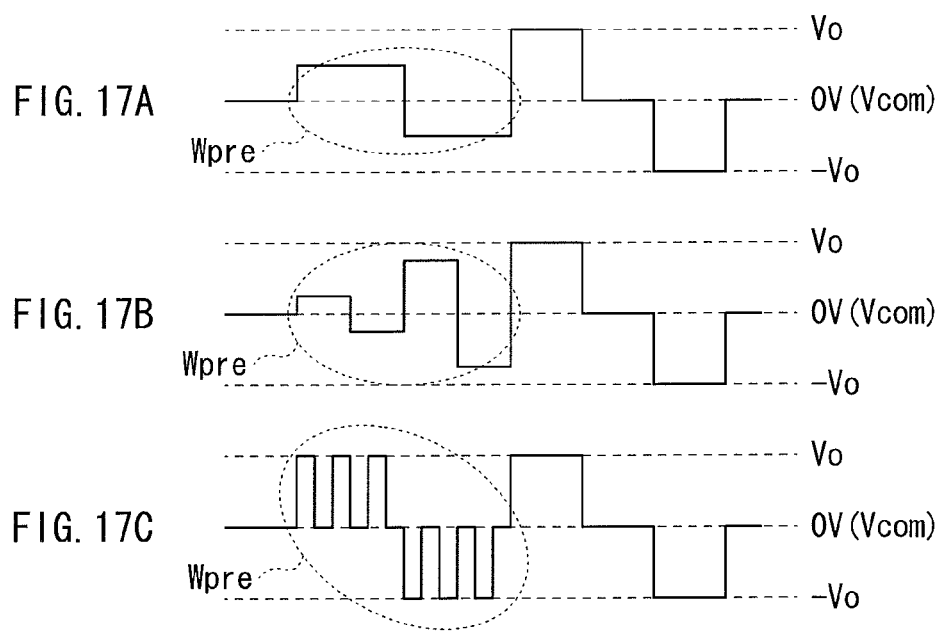

DISPLAY UNIT, BARRIER DEVICE, AND METHOD OF DRIVING DISPLAY UNIT

BACKGROUND

The present disclosure is related to a display unit of a parallax barrier type that enables a stereoscopic display, a barrier device for use in such a display unit, and a method of driving the display unit.

In recent years, display units capable of achieving a stereoscopic display have been attracting attention. The stereoscopic display displays left-eye images and right-eye images with parallax components (different perspectives) with respect to one another, allowing viewers to recognize those images as stereoscopic images with a depth by viewing each of those images with their left and right eyes. Further, display units have been also developed that enable to provide more natural stereoscopic images to viewers by displaying three or more images with parallax components with respect to each other. These display units include a display unit of a parallax barrier type. This type of a display unit displays a plurality of images (perspective images) with parallax components with respect to each other at the same time, and makes viewed images different depending on a relative positional relationship (angle) between a display unit and view points of a viewer. For example, Japanese Unexamined Patent Application Publication No. 2009-104105 discloses a parallax-barrier-type display unit using a liquid crystal device as a barrier.

Meanwhile, in a liquid crystal display (LCD) unit, for example, a VA (Vertical Alignment) mode liquid crystal has been often used. In such a liquid crystal display unit, liquid crystal molecules are aligned with a longitudinal direction thereof perpendicular to a substrate surface when no voltage is applied (in an off state), whereas the liquid crystal molecules are aligned to fall down (tilt) depending on a magnitude of a voltage when a voltage is applied (in an on state). Therefore, when a voltage is applied to a liquid crystal layer in a state where no voltage is applied, and the liquid crystal molecules that are aligned to be perpendicular to the substrate surface fall down, they fall down in any direction, which may lead to a turbulent alignment of the liquid crystal molecules. In this case, in such a liquid crystal display unit, the response to a voltage is slow.

Consequently, to control a direction where the liquid crystal molecules fall down during a voltage response time, a method of arranging the liquid crystal molecules to be tilted toward a specific direction in advance (of giving a so-called pre-tilt) has been utilized. For example, Japanese Unexamined Patent Application Publication No. 2003-279946 and No. 2006-330638 propose a PSA (Polymer Sustained Alignment) method wherein a plurality of slits are provided on pixel electrodes to hold the liquid crystal molecules in a pre-tilt state using a polymer. According to such a method utilizing a pre-tilt, it is possible to improve the voltage response characteristics of the liquid crystal molecules.

SUMMARY

For such a parallax barrier type display unit using liquid crystal barriers, a quick opening/closing operation of the liquid crystal barriers is preferable.

It is desirable to provide a display unit, a barrier device, and a method of driving the display unit each of which is capable of reducing a response time of the liquid crystal barriers.

A display unit according to an embodiment of the present disclosure includes: a display section; a barrier section including a plurality of liquid crystal barriers switching an open state and a closed state; and a barrier driving section driving the barrier section with one or a plurality of barrier drive signals. Each of the barrier drive signals is a signal including a first waveform portion being configured of a series of waveforms allowing the liquid crystal barriers to be held in an open state over a plurality of frames, or a second waveform portion being configured of a series of waveforms allowing the liquid crystal barriers to be switched between an open state and a closed state, and a third waveform portion being located just before the first waveform portion or the second waveform portion and having an average pulse height value smaller than a maximum value of a pulse height value of the first waveform portion or the second waveform portion.

A barrier device according to an embodiment of the present disclosure includes: a barrier section including a plurality of liquid crystal barriers switching an open state and a closed state; and a barrier driving section driving the barrier section with one or a plurality of barrier drive signals. Each of the barrier drive signals is a signal including a first waveform portion being configured of a series of waveforms allowing the liquid crystal barriers to be held in an open state over a plurality of frames, or a second waveform portion being configured of a series of waveforms to allowing the liquid crystal barriers to be switched between an open state and a closed state, and a third waveform portion being located just before the first waveform portion or the second waveform portion and having an average pulse height value smaller than a maximum value of a pulse height value of the first waveform portion or the second waveform portion.

A method of driving the display unit according to an embodiment of the present disclosure, the method includes: providing one or a plurality of barrier drive signals to a plurality of liquid crystal barriers switching an open state and a closed state; and displaying images on a display section. Each of the barrier drive signals includes a first waveform portion being configured of a series of waveforms allowing the liquid crystal barriers to be held in an open state over a plurality of frames, or a second waveform portion being configured of a series of waveforms allowing the liquid crystal barriers to be switched between an open state and a closed state, and a third waveform portion being located just before the first waveform portion or the second waveform portion and having an average pulse height value smaller than a maximum value of a pulse height value of the first waveform portion or the second waveform portion.

In the display unit, the barrier device, and the method of driving the display unit according to the embodiments of the present disclosure, images displayed on the display section are viewed by a viewer by allowing a plurality of liquid crystal barriers to be in an open state. At this time, the barrier drive signal having the third waveform portion just before the first waveform portion or the second waveform portion is provided to the liquid crystal barriers.

The display unit, the barrier device, and the method of driving the display unit according to the embodiments of the present disclosure use the barrier drive signal having the third waveform portion just before the first waveform portion or the second waveform portion, thereby allowing a response time of the liquid crystal barriers to be reduced.

It is to be understood that both the foregoing general description and the following detailed description are exemplary, and are intended to provide further explanation of the technology as claimed.

BRIEF DESCRIPTION OF THE DRAWINGS

The accompanying drawings are included to provide a further understanding of the present disclosure, and are incorporated in and constitute a part of this specification. The drawings illustrate embodiments and, together with the specification, serve to explain the principles of the present technology.

FIGS. 11A and 11B are each a pattern diagram showing an operation example of the stereoscopic display unit shown in FIG. 1.

FIGS. 17A to 17C are each a waveform diagram showing a waveform example of a barrier drive signal according to another modification example of the embodiment of the present disclosure.

DETAILED DESCRIPTION OF THE PREFERRED EMBODIMENTS

Hereinafter, embodiments of the present disclosure are described in details with reference to the drawings.

CONFIGURATION EXAMPLE

Overall Configuration Example

Figure 1:
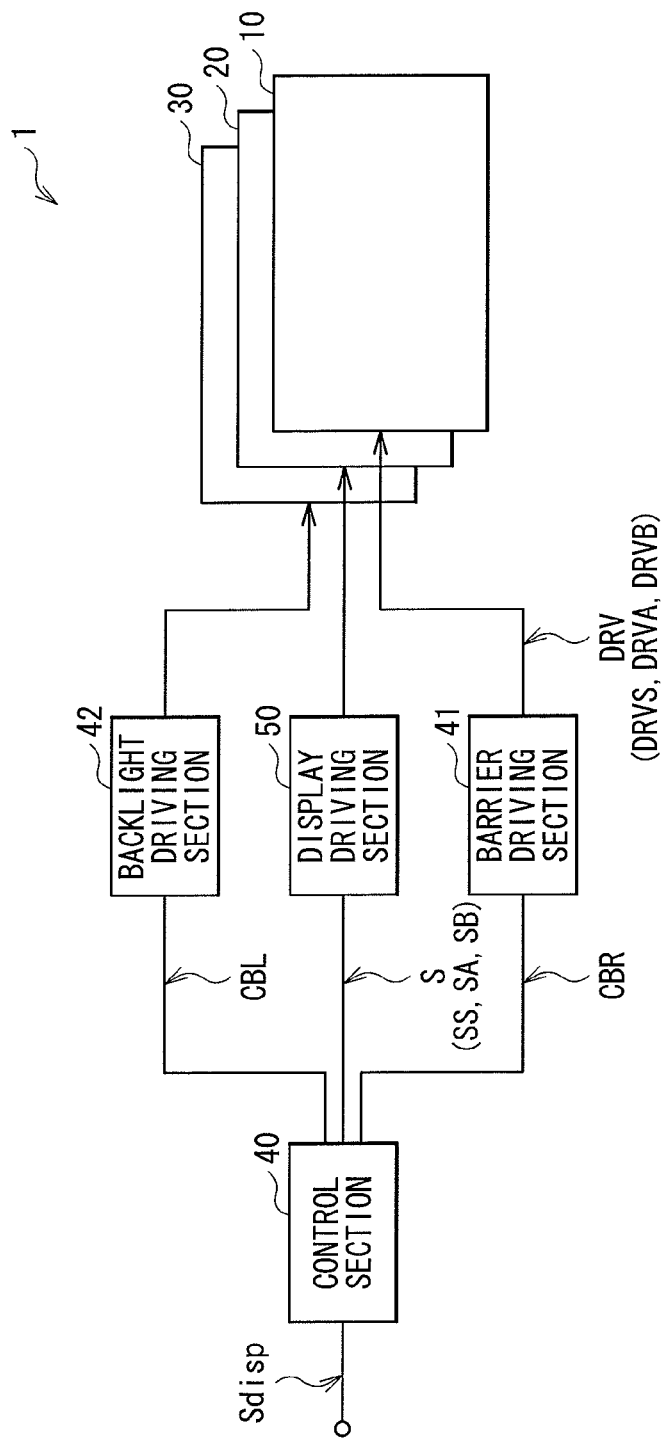
FIG. 1 is a block diagram showing a configuration example of a stereoscopic display unit according to an embodiment of the present disclosure.

FIG. 1 shows a configuration example of a stereoscopic display unit according to an embodiment of the present disclosure. It is to be noted that a barrier device and a method of driving a display unit according to embodiments of the present disclosure are also described together with this embodiment because both of them are embodied with this embodiment of the present disclosure. A stereoscopic display unit 1 includes a control section 40, a backlight driving section 42, a backlight 30, a display driving section 50, a display section 20, a barrier driving section 41, and a barrier section 10.

The control section 40 is a circuit that provides a control signal to each of the backlight driving section 42, the display driving section 50, and the barrier driving section 41 based on an image signal Sdisp provided externally for controlling these sections to operate in synchronization with each other. Specifically, the control section 40 provides a backlight control signal CBL to the backlight driving section 42, and delivers an image signal S based on the image signal Sdisp to the display driving section 50, while providing a barrier control signal CBR to the barrier driving section 41. With this arrangement, when the stereoscopic display unit 1 carries out a normal display (two-dimensional display) operation, as described later, the image signal S is composed of an image signal SS, and when the stereoscopic display unit 1 carries out a stereoscopic display operation, the image signal S is composed of image signals SA and SB each including a plurality of perspective images (four perspective images in this example).

The backlight driving section 42 drives the backlight 30 based on the backlight control signal CBL provided from the control section 40. The backlight 30 has a function to project plane-emitting light to the display section 20. The backlight 30 is composed by the use of, for example, an LED (Light Emitting Diode), a CCFL (Cold Cathode Fluorescent Lamp), and the like.

The display driving section 50 drives the display section 20 on the basis of the image signal S provided from the control section 40. The display section 20 is a liquid crystal display section in this example, performing a display operation in a manner to modulate light emitted from the backlight 30 by driving a liquid crystal display device.

The barrier driving section 41 generates a barrier drive signal DRV based on the barrier control signal CBR provided from the control section 40, providing the generated signal to the barrier section 10. The barrier section 10 has a plurality of liquid crystal barriers 11 and 12 (to be described later) to transmit therethrough (open state) or block the light (closed state) that is projected from the backlight 30 and transmitted through the display section 20. Here, as described later, the barrier drive signal DRV includes a barrier drive signal DRVS for driving the liquid crystal barrier 11, a barrier drive signal DRVA for driving a liquid crystal barrier 12A (to be described later), and a barrier drive signal DRVB for driving a liquid crystal barrier 12B (to be described later).

As shown in FIG. 1, in the stereoscopic display unit 1, the backlight 30, the display section 20, and the barrier section 10 are disposed in this order. That is, the light projected from the backlight 30 reaches a viewer via the display section 20 and the barrier section 10.

(Display Driving Section 50 and Display Section 20)

Figure 2:
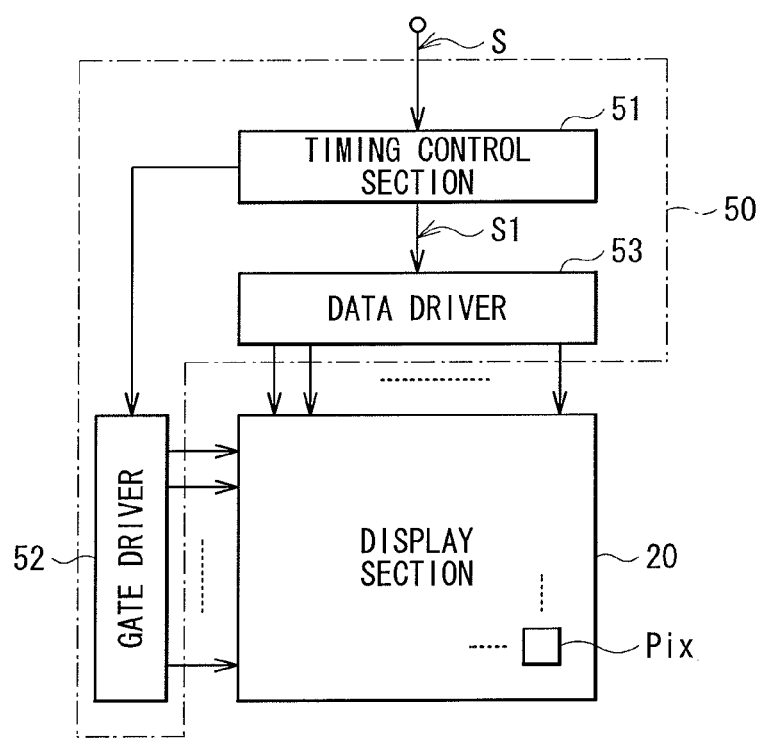
FIG. 2 is a block diagram showing a configuration example of a display driving section shown in FIG. 1.

FIG. 2 shows an example of a block diagram of the display driving section 50 and the display section 20. The display driving section 50 includes a timing control section 51, a gate driver 52, and a data driver 53. The timing control section 51 controls drive timings for the gate driver 52 and the data driver 53, while providing the image signal S delivered from the control section 40 to the data driver 53 as an image signal S1. The gate driver 52 sequentially selects pixels Pix within the display section 20 for each row for line-sequential scanning under a timing control performed by the timing control section 51. The data driver 53 provides a pixel signal based on the image signal S1 to each of the pixels Pix within the display section 20.

Figure 3A:
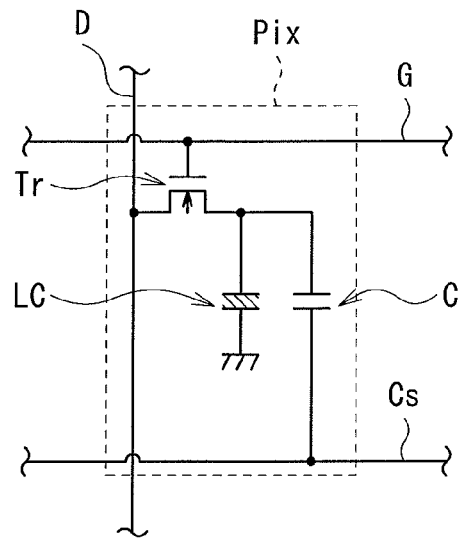
FIGS. 3A and 3B are each an explanatory diagram showing a configuration example of a display section shown in FIG. 1.
Figure 3B:
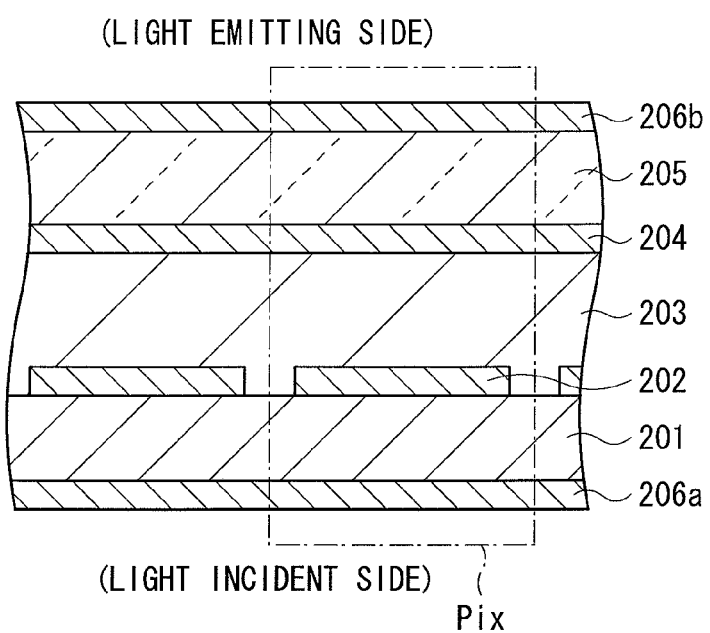

FIGS. 3A and 3B each show a configuration example of the display section 20, wherein FIG. 3A illustrates an example of a circuit diagram of the pixel Pix, while FIG. 3B illustrates a cross-sectional structure of the display section 20.

As shown in FIG. 3A, the pixel Pix includes a TFT (Thin Film Transistor) device Tr, a liquid crystal device LC, and a holding capacitor device C. The TFT device Tr is composed of, for example, a MOS-FET (Metal Oxide Semiconductor-Field Effect Transistor) with a gate connected to a gate line G, a source connected to a data line D, and a drain connected to a first end of the liquid crystal device LC and a first end of the holding capacitor device C. For the liquid crystal device LC, the first end is connected to the drain of the TFT device Tr, while a second end is grounded. For the holding capacitor device C, the first end is connected to the drain of the TFT device Tr, while a second end is connected to a holding capacitor line Cs. The gate line G is connected to the gate driver 52, and the data line D is connected to the data driver 53.

As shown in FIG. 3B, in the display section 20, a liquid crystal layer 203 is arranged between a drive substrate 201 and a counter substrate 205 and is sealded. The drive substrate 201 includes a pixel drive circuit (not shown in the figure) including the above-described TFT device Tr, wherein a pixel electrode 202 is arranged for each of the pixels Pix on the drive substrate 201. On the counter substrate 205, a color filter and a black matrix (not shown in the figure) are formed, and further, on the surface of the liquid crystal layer 203 side, a counter electrode 204 is arranged as an electrode common to each of the pixels Pix. On the light incident side (backlight 30 side in this case) and the light emitting side (barrier section 10 side in this case) of the display section 20, polarizers 206a and 206b are attached to one another to become cross-nicol or parallel-nicol with each other.

(Barrier Section 10 and Barrier Driving Section 41)

Figure 4A:
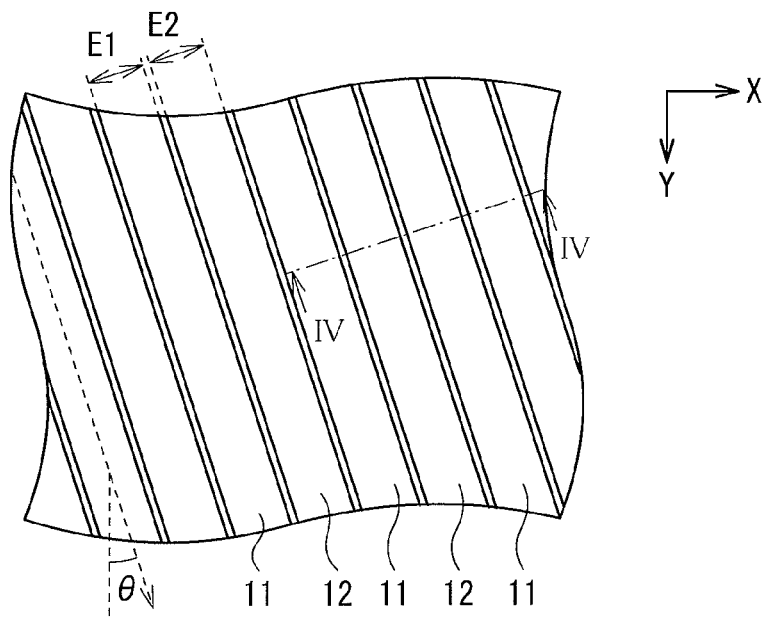
FIGS. 4A and 4B are each an explanatory diagram showing a configuration example of a barrier section shown in FIG. 1.
Figure 4B:
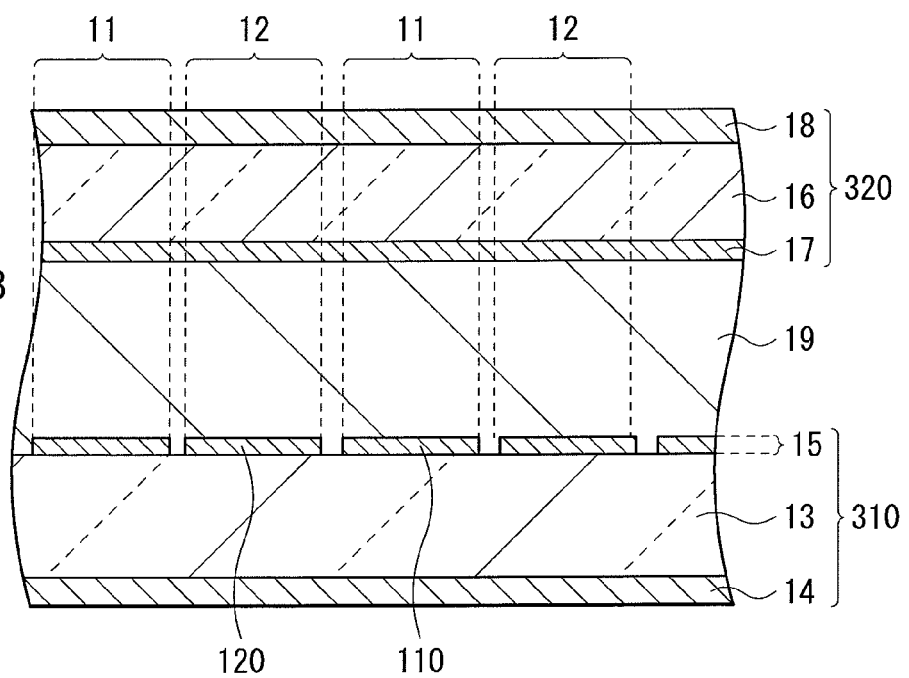

FIGS. 4A and 4B each show a configuration example of the barrier section 10, wherein FIG. 4A illustrates an arrangement configuration of the liquid crystal barriers on the barrier section 10, while FIG. 4B illustrates a cross-sectional structure in the IV-IV arrow-view direction in the barrier section 10 shown in FIG. 4A. It is to be noted that the barrier section 10 carries out a normally black operation in this example. That is, the barrier section 10 blocks light in a non-driven state.

The barrier section 10, which is a so-called parallax barrier, has a plurality of liquid crystal barriers 11 and 12 that are arranged alternately to transmit therethrough or block light as shown in FIG. 4A. These liquid crystal barriers 11 and 12 perform different operations depending on whether the stereoscopic display unit 1 carries out either a normal display (two-dimensional display) or a stereoscopic display. Specifically, as described later, the liquid crystal barriers 11 are placed into an open state (transmission state) during a normal display (two-dimensional display), and are placed into a closed state (blocking state) during a stereoscopic display. As described later, the liquid crystal barriers 12 are placed into an open state during a normal display, and operate to be switched between an open state and a closed state on a time-division basis (opening/closing operation) during a stereoscopic display.

The liquid crystal barriers 11 and 12 are provided to extend in one direction (for example, a direction forming a predetermined angle θ from a vertical direction Y) on the X-Y plane. The angle θ is allowed to be set at about 18 degrees for example. With such an arrangement, the liquid crystal barriers 11 and 12 are formed to extend toward an oblique direction, thereby allowing to reduce a possibility that moire could occur on a display screen as well as to suppress deterioration in the resolution during a stereoscopic display. In this example, a width E1 of the liquid crystal barrier 11 and a width E2 of the liquid crystal barrier 12 are equal to one another (E1=E2). However, a magnitude relation in the width of the liquid crystal barriers 11 and 12 is not limited thereto, and the width E1 may be greater (E1>E2) or smaller (E1<E2) than the width E2 alternatively. It is to be noted that the widths E1 and E2 are determined depending on an array pitch of the pixels Pix in the display section 20 and the number of perspectives of displayed perspective images.

As shown in FIG. 4B, the barrier section 10 includes a liquid crystal layer 19 between a drive substrate 310 and a counter substrate 320.

The drive substrate 310 includes a transparent substrate 13 and a transparent electrode layer 15. The transparent substrate 13 is made of, for example, glass. Thereon, the transparent electrode layer 15 is formed with a planarizing film in between that is not shown in the figure. The transparent electrode layer 15 is made of a transparent conductive film such as ITO (Indium Tin Oxide). Further, on the transparent electrode layer 15, there is formed an alignment film that is not shown in the figure. On the surface opposite to the surface where the transparent electrode layer 15 and the like are formed on the drive substrate 310, a polarizer 14 is attached.

The counter substrate 320 includes a transparent substrate 16 and a transparent electrode layer 17. Like the transparent substrate 13, the transparent substrate 16 is made of, for example, glass. On the transparent substrate 16, the transparent electrode layer 17 is formed. Like the transparent electrode layer 15, the transparent electrode layer 17 is made of a transparent conductive film such as ITO. Further, on the transparent electrode layer 17, there is formed an alignment film that is not shown in the figure. On the surface opposite to the surface where the transparent electrode layer 17 and the like are formed on the counter substrate 320, a polarizer 18 is attached. The polarizers 14 and 18 are attached to one another to become cross-nicol with each other. In particular, for example, the polarizer 14 is disposed with a transmission axis taken along a horizontal direction X, while the polarizer 18 is disposed with a transmission axis taken along a vertical direction Y.

The liquid crystal layer 19 includes, for example, liquid crystal molecules of a VA (Vertical Alignment) type. These liquid crystal molecules take a rotation-symmetric shape with respect to each of long and short axes thereof as a central axis for example, exhibiting a negative dielectric constant anisotropy (a property with a dielectric constant in the long axis direction smaller than that in the short axis direction).

The transparent electrode layer 15 has a plurality of transparent electrodes 110 and 120. The barrier drive signal DRV is applied to each of the transparent electrodes 110 and 120 by the barrier driving section 41. The transparent electrode layer 17 is provided as a so-called common electrode covering positions corresponding to the plurality of transparent electrodes 110 and 120, and a common voltage Vcom is applied to the transparent electrode layer 17. In this example, the common voltage Vcom is a DC voltage of 0 V, although it is not limited thereto. The transparent electrodes 110 in the transparent electrode layer 15 and portions corresponding to the transparent electrodes 110 of the liquid crystal layer 19 and the transparent electrode layer 17 compose the liquid crystal barriers 11. Similarly, the transparent electrodes 120 in the transparent electrode layer 15 and portions corresponding to the transparent electrodes 120 of the liquid crystal layer 19 and the transparent electrode layer 17 compose the liquid crystal barriers 12. With such arrangement configuration, in the barrier section 10, a voltage is selectively applied to the transparent electrodes 110 and 120, and the liquid crystal layer 19 is put into a liquid crystal alignment in accordance with the applied voltage, thereby making it possible to perform an opening/closing operation for each of the liquid crystal barriers 11 and 12.

Figure 5:
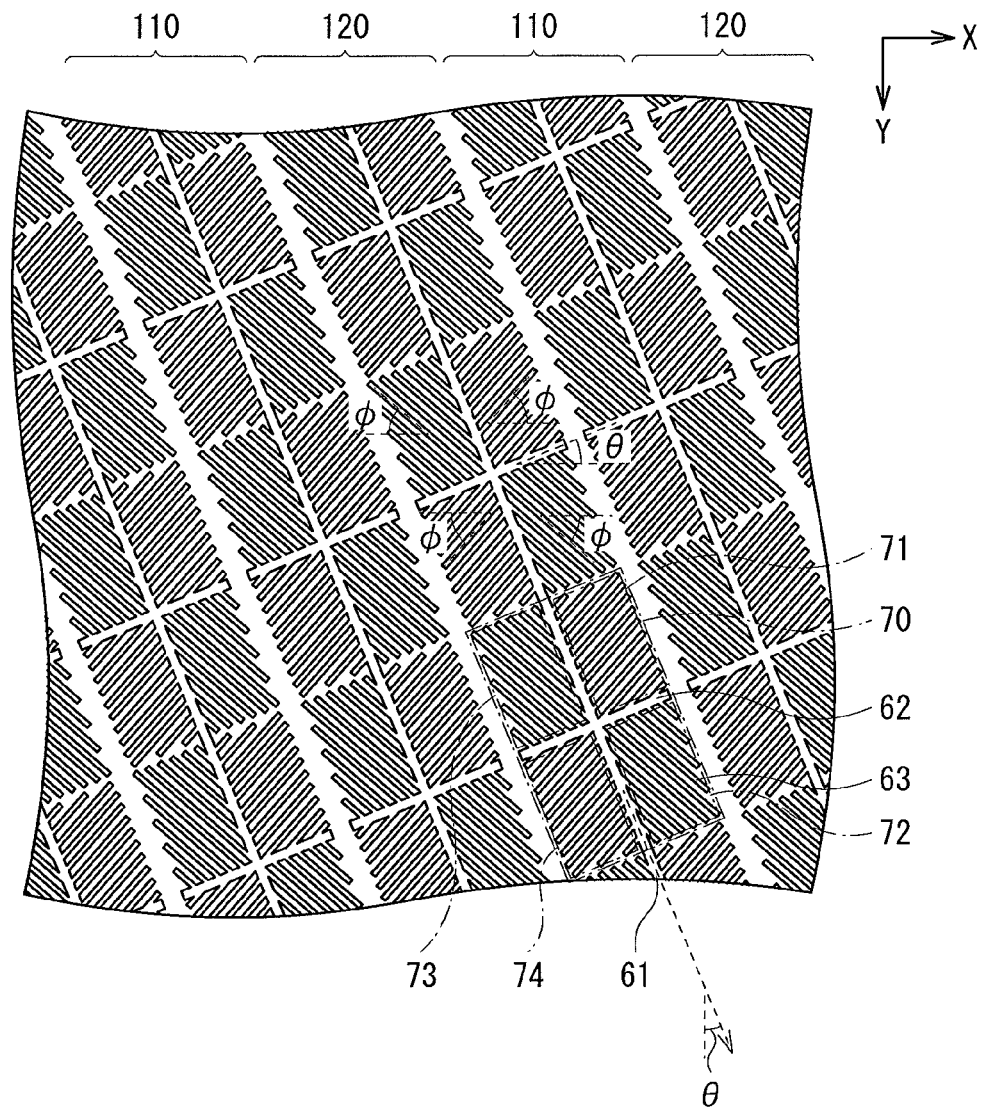
FIG. 5 is an explanatory diagram showing a configuration example of transparent electrodes in the barrier section shown in FIG. 1.

FIG. 5 shows a configuration example of the transparent electrodes 110 and 120 in the transparent electrode layer 15. Each of the transparent electrodes 110 and 120 has a stem portion 61 extending in the same direction as the extending direction of the liquid crystal barriers 11 and 12 (direction forming the predetermined angle θ from the vertical direction Y). In each of the transparent electrodes 110 and 120, sub-electrode regions 70 are provided side by side along the extending direction of the stem portion 61. Each of the sub-electrode regions 70 has a stem portion 62 and a branch portion 63. The stem portion 62 is formed to extend in a direction intersecting with the stem portion 61 and extends in a direction forming a predetermined angle θ from the horizontal direction X in this example. In each of the sub-electrode regions 70, there are provided four branch regions (domains) 71 to 74 that are separated by the stem portion 61 and the stem portion 62.

The branch portions 63 are formed to extend from the stem portions 61 and 62 in each of the branch regions 71 to 74. A line width of each of the branch portions 63 is equal to each other in the branch regions 71 to 74. Similarly, a slit width of each of the branch portions 63 is also equal to each other in the branch regions 71 to 74. The branch portions 63 in each of the branch regions 71 to 74 extend in the same direction. The extending direction of the branch portions 63 in the branch region 71 and the extending direction of the branch portions 63 in the branch region 73 are axisymmetric relative to the vertical direction Y as an axis, and similarly, the extending direction of the branch portions 63 in the branch region 72 and the extending direction of the branch portions 63 in the branch region 74 are axisymmetric relative to the vertical direction Y as an axis. Further, the extending direction of the branch portions 63 in the branch region 71 and the extending direction of the branch portions 63 in the branch region 72 are axisymmetric relative to the horizontal direction X as an axis, and similarly, the extending direction of the branch portions 63 in the branch region 73 and the extending direction of the branch portions 63 in the branch region 74 are axisymmetric relative to the horizontal direction X as an axis. In this example, specifically, the branch portions 63 in the branch regions 71 and 74 extend in the direction rotated at a predetermined angle φ counterclockwise from the horizontal direction X, while the branch portions 63 in the branch regions 72 and 73 extend in the direction rotated at a predetermined angle φ clockwise from the horizontal direction X. It is desirable that the angle φ be about 45 degrees, for example.

It is to be noted that, in this example, as described above, the angle φ is desirably about 45 degrees because the transmission axes of the polarizers 14 and 18 in the barrier section 10 are oriented along the horizontal direction X and the vertical direction Y, although the angle φ is desirably about 0 and 90 degrees for example when the transmission axes of the polarizers 14 and 18 in the barrier section 10 are oriented along the direction at about 45 degrees from the horizontal direction X and the vertical direction Y. This case corresponds to a case where the display section 20 is, for example, a liquid crystal display unit using a TN (Twisted Nematic) liquid crystal.

Figure 6:
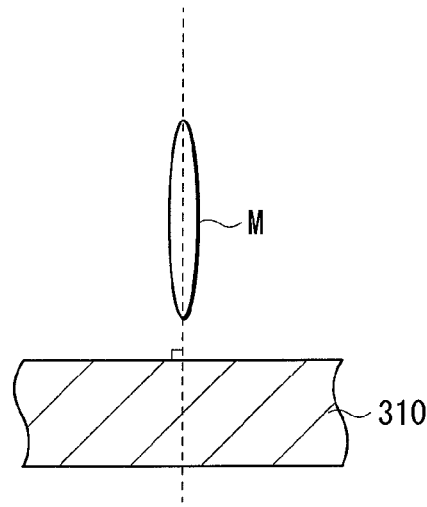
FIG. 6 is an explanatory diagram showing an alignment of liquid crystal molecules in the barrier section shown in FIG. 1.

FIG. 6 shows an alignment of liquid crystal molecules M when no voltage is applied in the liquid crystal layer 19. In the liquid crystal layer 19, the longitudinal direction of the liquid crystal molecules M in the vicinity of an interface with an alignment film is aligned to be almost perpendicular to the substrate surface by a restriction from the alignment film, and any other liquid crystal molecules (for example, liquid crystal molecules in the vicinity of a center in the thickness direction of the liquid crystal layer 19) are also aligned in an equivalent direction following the alignment of the liquid crystal molecules in the vicinity of the interface.

With such a configuration, when a voltage is applied to each of the transparent electrodes 110 and 120 as well as the transparent electrode layer 17 and the potential difference between voltages at both sides of the liquid crystal layer 19 becomes large, the light transmittance of the liquid crystal layer 19 increases, resulting in the liquid crystal barriers 11 and 12 transiting from a blocking state (closed state) to a transmission state (open state). At this time, electric field components in the direction parallel to the substrate surface is generated by the branch portions 63 in the transparent electrodes 110 and 120, and the liquid crystal molecules M fall down in response to the applied voltage, causing the liquid crystal barriers 11 and 12 to transit from a blocking state to a transmission state. On the other hand, as the potential difference becomes small, the longitudinal direction of the liquid crystal molecules M is aligned in a direction perpendicular to the substrate surface, and the light transmittance in the liquid crystal layer 19 decreases, resulting in the liquid crystal barriers 11 and 12 being placed into a blocking state (closed state).

Figure 7:
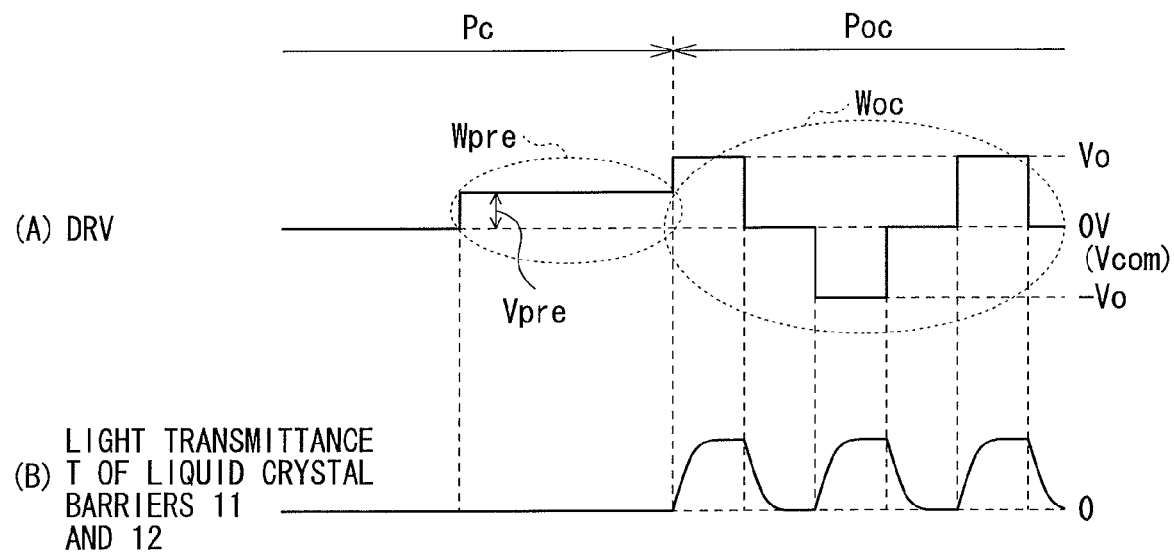
FIG. 7 is a waveform diagram of a barrier drive signal shown in FIG. 1.

FIG. 7 shows an operation example of the liquid crystal barriers 11 and 12. (A) of FIG. 7 shows a waveform example of the barrier drive signal DRV, while (B) of FIG. 7 shows a light transmittance T of the liquid crystal barriers 11 and 12. This example illustrates a case where the liquid crystal barriers 11 and 12 are changed from a closed state (blocking state) to a switching operating state on a time-division basis (opening/closing operating state) between an open state (transmission state) and a closed state (blocking state).

When the liquid crystal barriers 11 and 12 are changed from a closed state to an opening/closing operating state, the barrier driving section 41 provides the barrier drive signal DRV including an opening/closing drive waveform portion Woc and a preparatory drive waveform portion Wpre that is arranged just before the Woc to the liquid crystal barriers 11 and 12 as shown in (A) of FIG. 7.

The opening/closing drive waveform portion Woc is a waveform portion for repeatedly switching the liquid crystal barriers 11 and 12 between an open state and a closed state, and is a pulse signal transiting between −Vo, 0 V, and Vo (Vo is an open drive voltage) in this example. That is, the opening/closing drive waveform portion Woc is an AC waveform centered on 0 V (Vcom) to reduce a possibility that so-called burning could occur on the liquid crystal layer 19. The open drive voltage Vo, which is a voltage necessary to put the liquid crystal barriers 11 and 12 into an open state, is about 7 V, for example. When −Vo or Vo is provided to the liquid crystal barriers 11 and 12, an absolute value of the potential difference between the transparent electrode layers 15 and 17 at both sides of the liquid crystal layer 19 becomes Vo in the liquid crystal barriers 11 and 12, and the liquid crystal molecules M in the liquid crystal layer 19 fall down in response to this applied voltage. As a result, the liquid crystal barriers 11 and 12 are put into an open state (transmission state) with increased light transmittance T as shown in (B) of FIG. 7. On the other hand, 0 V is provided to the liquid crystal barriers 11 and 12, the absolute value of the potential difference between the transparent electrode layers 15 and 17 at both sides of the liquid crystal layer 19 becomes 0 V, and the longitudinal direction of the liquid crystal molecules M is aligned to be perpendicular to the substrate surface. As a result, the liquid crystal barriers 11 and 12 are put into a closed state (blocking state) with decreased light transmittance T as shown in (B) of FIG. 7.

The preparatory drive waveform portion Wpre is a waveform portion for making preparation as a preliminary step to put the liquid crystal barriers 11 and 12 into an opening/closing operating state, and is a DC waveform having a pre-voltage Vpre in this example. Here, the pre-voltage Vpre, which is a voltage lower than the open drive voltage Vo, is about 2 V, for example. In the liquid crystal barriers 11 and 12 with this preparatory drive waveform portion Wpre applied thereon, the absolute value of the potential difference between the transparent electrode layers 15 and 17 at both sides of the liquid crystal layer 19 becomes Vpre. At this time, the longitudinal direction of the liquid crystal molecules M in the liquid crystal layer 19 is aligned to be inclined from the direction perpendicular to the substrate surface. In other words, each of the liquid crystal molecules M is aligned in a substantially-matched state in a predetermined azimuthal direction without turbulence. It is to be noted that, still in this state, the light transmittance T of the liquid crystal barriers 11 and 12 is kept sufficiently low, and the liquid crystal barriers 11 and 12 remain in a state close to a closed state. Further, when the opening/closing drive waveform portion Woc is applied following the preparatory drive waveform portion Wpre, the liquid crystal molecules M are allowed to fall down in a short time.

Figure 8:
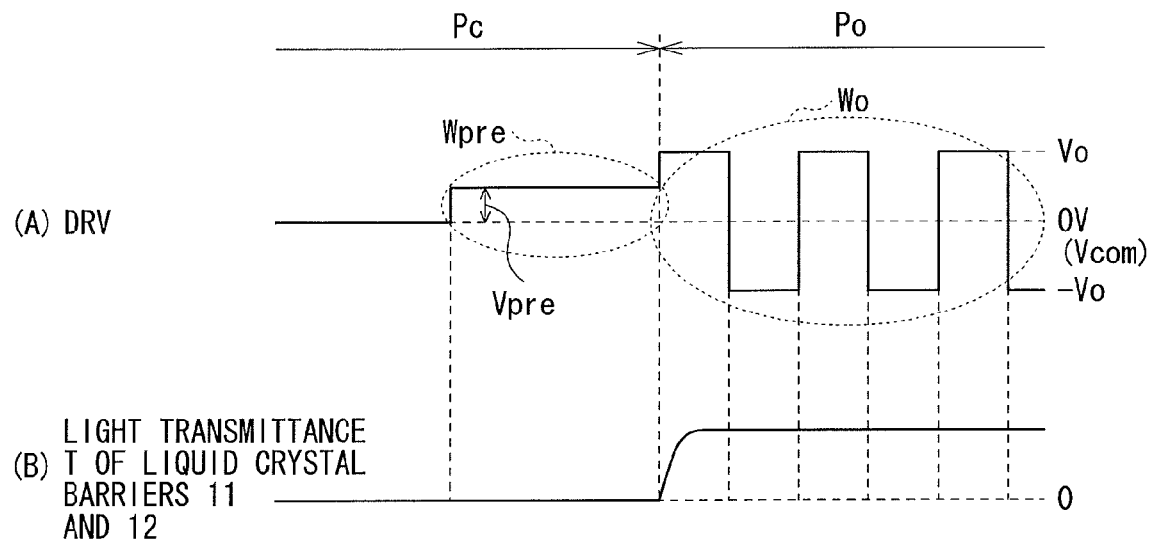
FIG. 8 is a waveform diagram of another barrier drive signal shown in FIG. 1.

FIG. 8 shows another operation example of the liquid crystal barriers 11 and 12. (A) of FIG. 8 shows another waveform example of the barrier drive signal DRV, while (B) of FIG. 8 shows the light transmittance T of the liquid crystal barriers 11 and 12. This example illustrates a case where the liquid crystal barriers 11 and 12 are changed from a closed state (blocking state) to an open state (transmission state).

When the liquid crystal barriers 11 and 12 are changed from a closed state to an open state, the barrier driving section 41 provides the barrier drive signal DRV including an open drive waveform portion Wo and a preparatory drive waveform portion Wpre that is arranged just before the Wo to the liquid crystal barriers 11 and 12 as shown in (A) of FIG. 8.

The open drive waveform portion Wo is a waveform portion for keeping the liquid crystal barriers 11 and 12 in an open state, and is an AC waveform pulse signal transiting between −Vo and Vo (Vo is an open drive voltage) in this example. When −Vo or Vo is provided to the liquid crystal barriers 11 and 12, the absolute value of the potential difference between the transparent electrode layers 15 and 17 at both sides of the liquid crystal layer 19 becomes Vo in the liquid crystal barriers 11 and 12, and the liquid crystal molecules M in the liquid crystal layer 19 fall down in response to this applied voltage. As a result, the liquid crystal barriers 11 and 12 are put into an open state (transmission state) with increased light transmittance T as shown in (B) of FIG. 8.

The preparatory drive waveform portion Wpre that is located before the open drive waveform portion Wo is a waveform portion for making preparation as a preliminary step to put the liquid crystal barriers 11 and 12 into an opening/closing operating state as with the case in FIG. 7.

As described above, in the stereoscopic display unit 1, provision of the preparatory drive waveform portion Wpre allows to reduce the subsequent transition time to an open state, and to reduce the response time of the liquid crystal barriers 11 and 12. Further, in the stereoscopic display unit 1, provision of the preparatory drive waveform portion Wpre enables to reduce turbulence in the alignment direction (azimuthal angle) of the liquid crystal molecules M, thereby allowing the transmittance at the time when the liquid crystal barriers 11 and 12 are put into an open state to be further enhanced.

On the barrier section 10, the plurality of liquid crystal barriers 12 form groups, and the plurality of liquid crystal barriers 12 belonging to the same group perform opening and closing operations at the same timing in carrying out a stereoscopic display. Hereinafter, groups of the liquid crystal barriers 12 are described.

Figure 9:
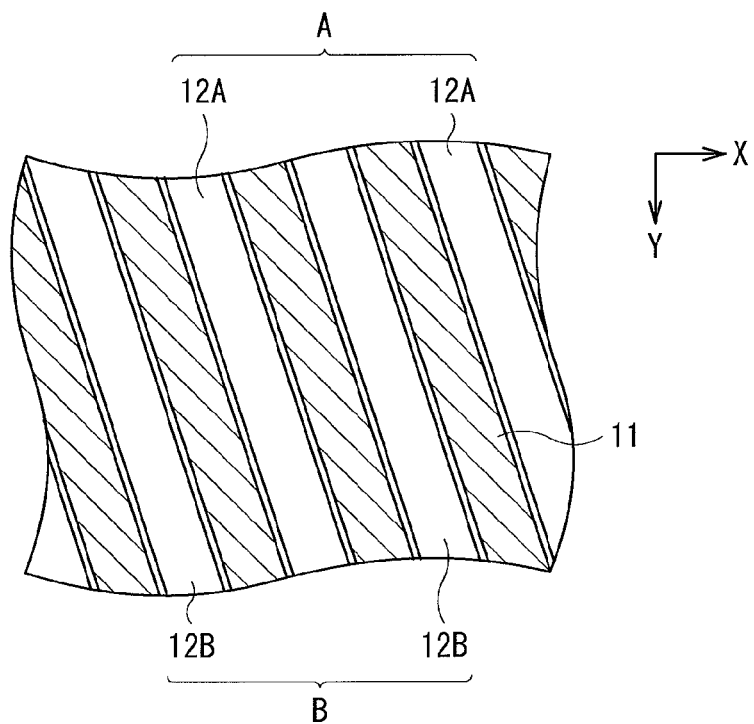
FIG. 9 is an explanatory diagram showing a group configuration example of liquid crystal barriers shown in FIG. 1.

FIG. 9 shows a group configuration example of the liquid crystal barriers 12. In this example, the liquid crystal barriers 12 form two groups. In particular, the plurality of liquid crystal barriers 12 that are arranged side by side compose a group A and a group B alternately. It is to be noted that liquid crystal barriers 12A are used as appropriate as a collective term of the liquid crystal barriers 12 belonging to the group A, and similarly liquid crystal barriers 12B are used as appropriate as a collective term of the liquid crystal barriers 12 belonging to the group B.

In carrying out a stereoscopic display, the plurality of liquid crystal barriers 12 belonging to the same group perform opening/closing operations at the same timing. In particular, the plurality of liquid crystal barriers 12 belonging to the group A (liquid crystal barriers 12A) and the plurality of liquid crystal barriers 12 belonging to the group B (liquid crystal barriers 12B) perform opening/closing operations to be put into an open state (transmission state) alternately on a time-division basis. At this time, the liquid crystal barriers 11 are put into a closed state (blocking state). Further, in carrying out a normal display (two-dimensional display), the liquid crystal barriers 11 and 12 (12A and 12B) are all put into an open state.

Figure 10A:
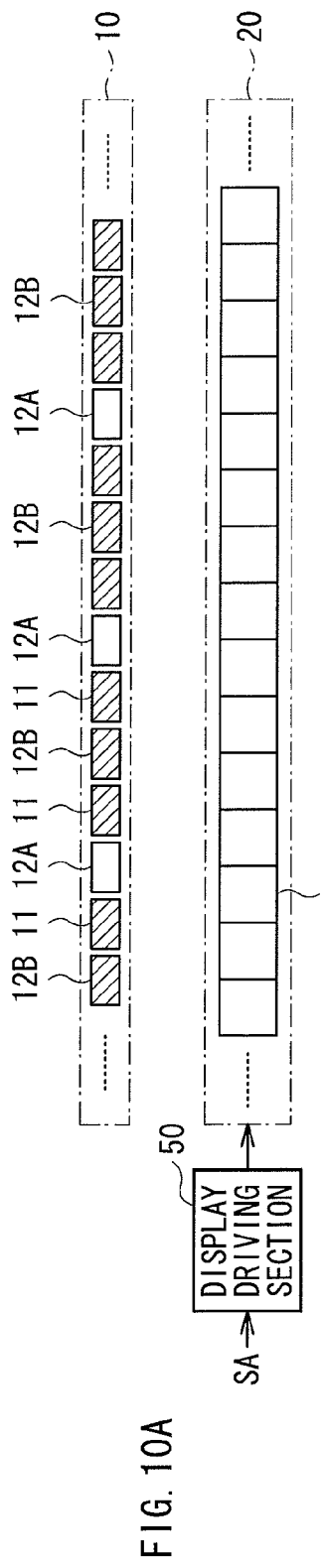
FIGS. 10A to 10C are each a pattern diagram showing an operation example of the display section and the barrier section shown in FIG. 1.
Figure 10B:
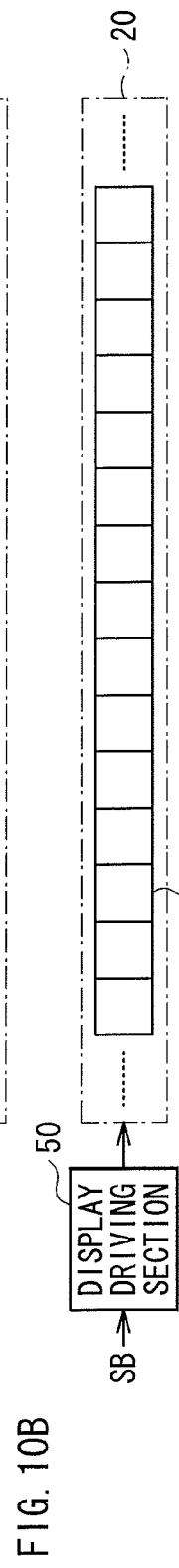
Figure 10C:
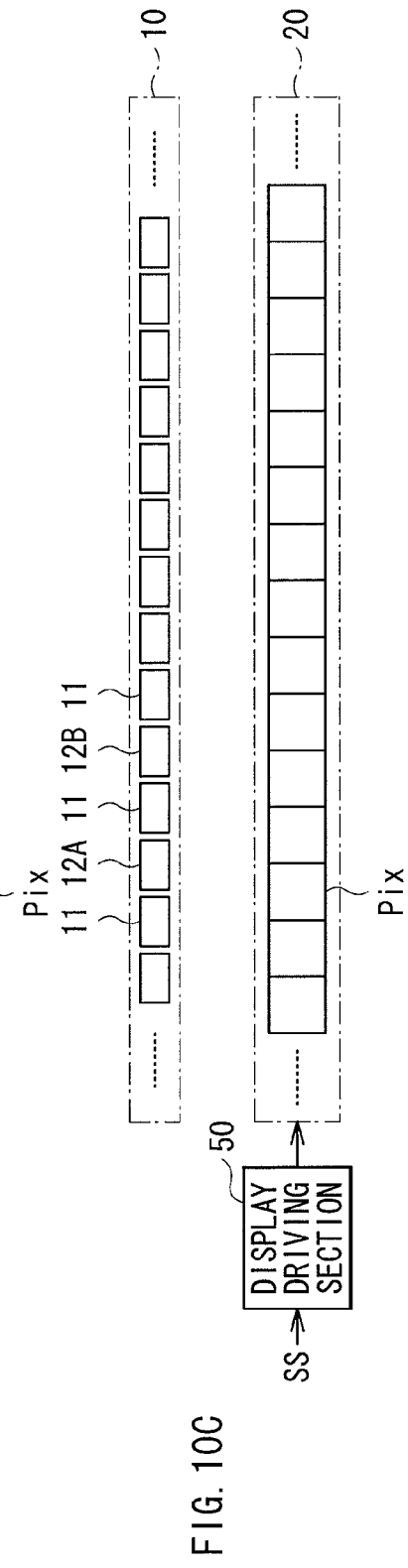

FIGS. 10A to 10C show states of the barrier section 10 in carrying out a stereoscopic display and a normal display (two-dimensional display) as a pattern diagram using a cross-sectional structure. FIG. 10A shows a state in performing a stereoscopic display, and FIG. B shows another state in performing a stereoscopic display, while FIG. 10C shows a state in performing a normal display. In this example, the liquid crystal barriers 12A are provided at a rate of one piece per four pixels Pix in the display section 20. In the same way, the liquid crystal barriers 12B are provided at a rate of one piece per four pixels Pix in the display section 20 as well. In the following descriptions, the pixel Pix is composed of three sub-pixels (RGB), although the pixel configuration is not limited thereto, and, alternatively, for example, the pixel Pix may be a sub-pixel. Further, portions where light is blocked in the barrier section 10 are marked with oblique lines.

In carrying out a stereoscopic display, image signals SA and SB are alternately supplied to the display driving section 50, and the display section 20 performs a display operation based on such supplied image signals. In the barrier section 10, the liquid crystal barriers 12 (liquid crystal barriers 12A and 12B) perform opening/closing operations on a time-division basis, while the liquid crystal barriers 11 remain in a closed state (blocking state). Specifically, when the image signal SA is provided, as shown in FIG. 10A, the liquid crystal barriers 12A are put into an open state, while the liquid crystal barriers 12B are put into an closed state. In the display section 20, as described later, four pixels Pix that are arranged adjacently to each other at positions corresponding to the liquid crystal barriers 12A carry out a display corresponding to four perspective images included in the image signal SA. Consequently, as described later, a viewer sees different perspective images with his left eye and his right eye for example, perceiving displayed images as stereoscopic images. Similarly, when the image signal SB is provided, as shown in FIG. 10B, the liquid crystal barriers 12B are put into an open state, while the liquid crystal barriers 12A are put into a closed state. In the display section 20, as described later, four pixels Pix that are arranged adjacently to each other at positions corresponding to the liquid crystal barriers 12B carry out a display corresponding to four perspective images included in the image signal SB. Consequently, as described later, a viewer sees different perspective images with his left eye and his right eye for example, perceiving displayed images as stereoscopic images. In the stereoscopic display unit 1, images are displayed by alternately opening the liquid crystal barriers 12A and the liquid crystal barriers 12B in such a manner, thereby allowing the resolution of the display unit to be improved as described later.

In carrying out a normal display (two-dimensional display), in the barrier section 10, both of the liquid crystal barriers 11 and the liquid crystal barriers 12 (liquid crystal barriers 12A and 12B) remain in an open state (transmission state) as shown in FIG. 10C. As a result, a viewer is allowed to see normal two-dimensional images as they are that are displayed on the display section 20 based on the image signal SS.

The open drive waveform portion Wo corresponds to a specific example of a "first waveform portion" in the present disclosure. The opening/closing drive waveform portion Woc corresponds to a specific example of a "second waveform portion" in the present disclosure. The preparatory drive waveform portion Wpre corresponds to a specific example of a "third waveform portion" in the present disclosure. The liquid crystal barriers 12 (12A and 12B) correspond to a specific example of a "first group of liquid crystal barriers" in the present disclosure, while the liquid crystal barriers 11 correspond to a specific example of a "second group of liquid crystal barriers" in the present disclosure. The stem portion 61 corresponds to a specific example of a "first stem portion" in the present disclosure, while the stem portion 62 corresponds to a specific example of a "second stem portion" in the present disclosure. The branch region 71 corresponds to a specific example of a "first branch region" in the present disclosure, while the branch region 72 corresponds to a specific example of a "second branch region" in the present disclosure, and the branch region 73 corresponds to a specific example of a "third branch region" in the present disclosure, and further, the branch region 74 corresponds to a specific example of a "fourth branch region" in the present disclosure.

[Operation and Action]

Subsequently, the description is provided on the operation and action of the stereoscopic display unit 1 according to the embodiment of the present disclosure.

(Overview of Overall Operation)

First, the overview of overall operation of the stereoscopic display unit 1 is described with reference to FIG. 1. The control section 40 provides a control signal to each of the display driving section 50, the backlight driving section 42, and the barrier driving section 41 based on the image signal Sdisp provided externally for controlling these sections to operate in synchronization with each other. The backlight driving section 42 drives the backlight 30 based on the backlight control signal CBL provided from the control section 40. The backlight 30 projects plane-emitting light to the display section 20. The display driving section 50 drives the display section 20 based on the image signal S provided from the control section 40. The display section 20 performs a display by modulating the light projected from the backlight 30. The barrier driving section 41 generates the barrier drive signal DRV based on the barrier control signal CBR provided from the control section 40, providing the generated signal to the barrier section 10. The liquid crystal barriers 11 and 12 (12A and 12B) in the barrier section 10 perform opening/closing operations based on the barrier control signal CBR, transmitting therethrough or blocking the light that is projected from the backlight 30 and transmitted through the display section 20.

(Detailed Operation of Stereoscopic Display)

Next, the description is provided on the detailed operation in carrying out a stereoscopic display with reference to several figures.

FIGS. 11A and 11B show an operation example of the display section 20 and the barrier section 10. FIG. 11A shows a case where the image signal SA is provided, while FIG. 11B shows a case where the image signal SB is provided.

When the image signal SA is provided, as shown in FIG. 11A, each of the pixels Pix in the display section 20 displays pixel information P1 to P4 corresponding to each of four perspective images included in the image signal SA. At this time, the pixel information P1 to P4 are respectively displayed at the pixels Pix arranged in the vicinity of the liquid crystal barriers 12A. When the image signal SA is provided, in the barrier section 10, control is carried out so that the liquid crystal barriers 12A are put into an open state (transmission state), while the liquid crystal barriers 12B are put into a closed state (blocking state). The light emitting from each of the pixels Pix on the display section 20 is output with its angle limited by the liquid crystal barriers 12A. A viewer is allowed to see stereoscopic images by viewing the pixel information P2 with his left eye and the pixel information P3 with his right eye, for example.

When the image signal SB is provided, as shown in FIG. 11B, each of the pixels Pix on the display section 20 displays pixel information P1 to P4 corresponding to each of four perspective images included in the image signal SB. At this time, the pixel information P1 to P4 are respectively displayed at the pixels Pix arranged in the vicinity of the liquid crystal barriers 12B. When the image signal SB is provided, in the barrier section 10, control is carried out so that the liquid crystal barriers 12B are put into an open state (transmission state), while the liquid crystal barriers 12A are put into a closed state (blocking state). The light emitting from each of the pixels Pix on the display section 20 is output with its angle limited by the liquid crystal barriers 12B. A viewer is allowed to see stereoscopic images by viewing the pixel information P2 with his left eye and the pixel information P3 with his right eye, for example.

In such a manner, a viewer sees different pixel information among the pixel information P1 to P4 with his left eye and his right eye, thereby allowing to feel such pixel information as stereoscopic images. Further, images are displayed with the liquid crystal barriers 12A and the liquid crystal barriers 12B being open alternately on the time-division basis, which enables a viewer to see averaged images displayed at positions shifted from each other. This allows the stereoscopic display unit 1 to achieve the resolution twice as high as a case where only the liquid crystal barriers 12A are provided. In other words, the resolution of the stereoscopic display unit 1 is reduced only to one third (=⅙×2) of the case of two-dimensional display.

In the stereoscopic display unit 1, to reduce the response time of the liquid crystal barriers 11 and 12, the barrier driving section 41 provides the preparatory drive waveform portion Wpre as the barrier drive signal DRV to the liquid crystal barriers 11 and 12. Specifically, after power startup is performed, or when a display mode is switched between a stereoscopic display and a normal display (two-dimensional display), the barrier driving section 41 provides the preparatory drive waveform portion Wpre as the barrier drive signal DRV to the liquid crystal barriers 11 and 12. Next, a display operation in the stereoscopic display unit 1 is described with reference to several examples.

First, the description is provided on an example of the power startup in the stereoscopic display mode.

Figure 12:
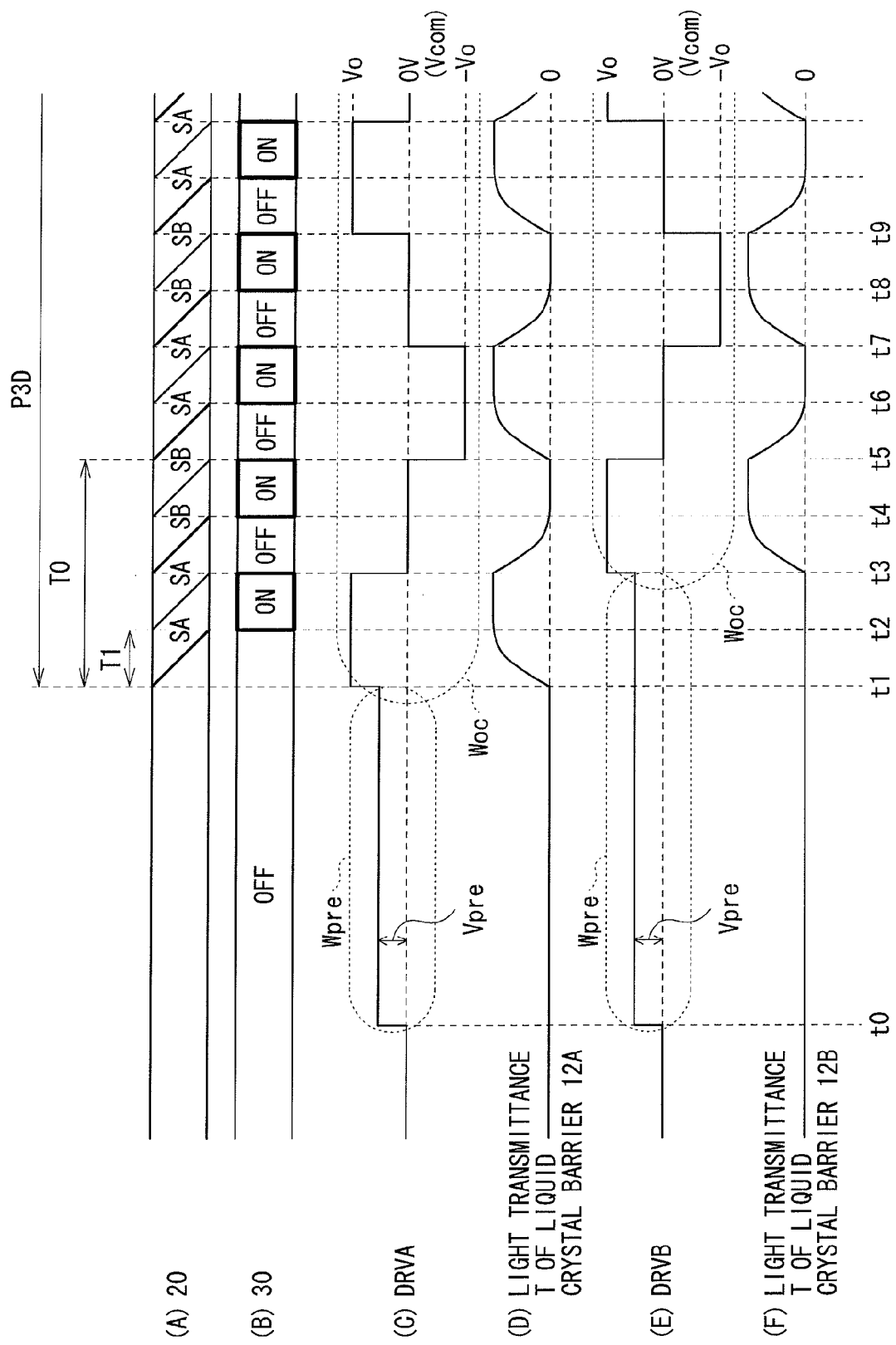
FIG. 12 is a timing waveform diagram showing an operation example of the stereoscopic display unit shown in FIG. 1.

FIG. 12 shows a timing diagram of the stereoscopic display operation after power startup. (A) of FIG. 12 shows an operation of the display section 20, (B) shows an operation of the backlight 30, (C) shows a waveform of the barrier drive signal DRVA, (D) shows the light transmittance T of the liquid crystal barriers 12A, (E) shows a waveform of the barrier drive signal DRVB, and (F) shows the light transmittance T of the liquid crystal barriers 12B. It is to be noted that, in this example, the barrier drive signal DRVS is 0 V, and the liquid crystal barriers 11 are put into a closed state (blocking state).

A vertical axis of (A) of FIG. 12 shows a position of line-sequential scanning direction (Y direction) of the display section 20. That is, (A) of FIG. 12 illustrates an operational state of the display section 20 at each position in the Y direction at a certain time. In (A) of FIG. 12, "SA" denotes a state where the display section 20 performs a display based on the image signal SA, while "SB" denotes a state where the display section 20 performs a display based on the image signal SB.

After power startup, during a timing period of t0 to t1, the stereoscopic display unit 1 prepares for a stereoscopic display operation, and after a timing t1, the backlight 30, the display section 20, and the barrier section operate in synchronization with each other, thereby starting the stereoscopic display operation. Hereinafter, the details are described.

First, during a timing period of t0 to t1, the barrier driving section 41 provides the preparatory drive waveform portion Wpre as a barrier drive signal DRVA to the liquid crystal barriers 12A ((C) of FIG. 12), while providing the preparatory drive waveform portion Wpre as a barrier drive signal DRVB to the liquid crystal barriers 12B ((E) of FIG. 12). As a result, in the liquid crystal layer 19 of the liquid crystal barriers 12 (12A and 12B), the longitudinal direction of the liquid crystal molecules M is aligned to be inclined from the direction perpendicular to the substrate surface. At this time, the light transmittance T of the liquid crystal barriers 12 remains in a sufficiently low state ((D) and (F) of FIG. 12).

Subsequently, after the timing t1, the stereoscopic display operation is started. In this stereoscopic display operation, through the line-sequential scanning performed in a scanning cycle T1, a display on the liquid crystal barriers 12A (display based on the image signal SA) and a display on the liquid crystal barriers 12B (display based on the image signal SB) are carried out on a time-division basis. These display operations are repeated for each display cycle T0. Here, the display cycle T0 is allowed to be set at, for example, about 16.7 [msec] (one cycle of 60 [Hz]). In this case, the scanning cycle T1 is about 4.2 [msec] (a quarter of the display cycle T0).

First, during a timing period of t1 to t2, in the display section 20, the line-sequential scanning is carried out from the uppermost part to the lowermost part on the basis of a drive signal provided from the display driving section 50 to perform a display based on the image signal SA ((A) of FIG. 12). The barrier driving section 41 applies the voltage Vo as the barrier drive signal DRVA to the liquid crystal barriers 12A ((C) of FIG. 12). As a result, in the barrier section 10, the light transmittance T of the liquid crystal barriers 12A rises ((D) of FIG. 12). At this time, in the liquid crystal layer 19 of the liquid crystal barriers 12A, since the longitudinal direction of the liquid crystal molecules M is aligned to be inclined from the perpendicular direction of the substrate surface at a preliminary step, the liquid crystal molecules M fall down quickly in response to application of the voltage Vo, and the light transmittance T rises quickly.

Subsequently, during a timing period of t2 to t3, in the display section 20, the line-sequential scanning is carried out from the uppermost part to the lowermost part on the basis of a drive signal provided from the display driving section 50 to perform a display based on the image signal SA once again ((A) of FIG. 12). In other words, the display section 20 displays the same frame image based on the image signal SA twice repeatedly. In the barrier section 10, the liquid crystal barriers 12A are put into an open state with sufficiently increased light transmittance T thereof ((D) of FIG. 12). Then, the backlight 30 turns on (ON) during this timing period of t2 to t3 ((B) of FIG. 12). This allows a viewer to see a display based on the image signal SA on the display section 20 during the timing period of t2 to t3. Further, since the light transmittance T is sufficiently low in the liquid crystal barriers 12B, images displayed on the basis of the image signals SA and SB are less likely to be mixed with each other, which makes it possible to reduce degradation in the image quality due to so-called a crosstalk.

Next, during a timing period of t3 to t4, in the display section 20, the line-sequential scanning is carried out from the uppermost part to the lowermost part on the basis of a drive signal provided from the display driving section 50 to perform a display based on the image signal SB ((A) of FIG. 12). The barrier driving section 41 applies 0 V as the barrier drive signal DRVA to the liquid crystal barriers 12A ((C) of FIG. 12), while applying the voltage Vo as the barrier drive signal DRVB to the liquid crystal barriers 12B ((E) of FIG. 12). As a result, in the barrier section 10, the light transmittance T of the liquid crystal barriers 12A decreases ((D) of FIG. 12), while the light transmittance T of the liquid crystal barriers 12B increases ((F) of FIG. 12). At this time, in the liquid crystal layer 19 of the liquid crystal barriers 12B, since the longitudinal direction of the liquid crystal molecules M is aligned to be inclined from the direction perpendicular to the substrate surface in a preliminary step, the liquid crystal molecules M fall down quickly in response to application of the voltage Vo, and the light transmittance T rises quickly. The backlight 30 turns off during this timing period of t3 to t4 ((B) of FIG. 12). Consequently, a viewer does not see transient change from a display based on the image signal SA to a display based on the image signal SB, and transient change of the light transmittance T in the liquid crystal barriers 12, which makes it possible to reduce degradation in the image quality.

During a timing period of t4 to t5, in the display section 20, the line-sequential scanning is carried out from the uppermost part to the lowermost part on the basis of a drive signal provided from the display driving section 50 to perform a display based on the image signal SB once again ((A) of FIG. 12). In other words, the display section 20 displays the same frame image based on the image signal SB twice repeatedly. In the barrier section 10, the liquid crystal barriers 12A are put into a closed state with sufficiently decreased light transmittance T thereof ((D) of FIG. 12), while the liquid crystal barriers 12B are put into an open state with sufficiently increased light transmittance T thereof ((F) of FIG. 12). Then, the backlight 30 turns on (ON) during this timing period of t4 to t5 ((B) of FIG. 12). This allows a viewer to see a display based on the image signal SB on the display section 20 during the timing period of t4 to t5. Further, since the light transmittance T is sufficiently low in the liquid crystal barriers 12A, images displayed on the basis of the image signals SA and SB are less likely to be mixed with each other, which makes it possible to reduce degradation in the image quality due to a so-called crosstalk.

Next, during a timing period of t5 to t6, in the display section 20, a display based on the image signal SA is performed as during the timing period of t1 to t2 ((A) of FIG. 12). The barrier driving section 41 applies a voltage (−Vo) as the barrier drive signal DRVA to the liquid crystal barriers 12A, while applying 0 V as the barrier drive signal DRVB to the liquid crystal barriers 12B ((C) and (E) of FIG. 12). As a result, in the barrier section 10, the light transmittance T of the liquid crystal barriers 12A increases, while the light transmittance T of the liquid crystal barriers 12B decreases ((D) and (F) of FIG. 12). At this time, in the liquid crystal layer 19 of the liquid crystal barriers 12A, at the timing t5, since the longitudinal direction of the liquid crystal molecules M does not completely return to the direction perpendicular to the substrate surface, being aligned toward a direction (a certain azimuthal angle direction) slightly inclined from the perpendicular direction, the liquid crystal molecules M fall down from this azimuthal angle direction quickly in response to application of the voltage (−Vo), and the light transmittance T rises quickly. The backlight 30 turns off during this timing period of t5 to t6 ((B) of FIG. 12).

During a timing period of t6 to t7, in the display section 20, a display based on the image signal SA is performed once again as during the timing period of t2 to t3 ((A) of FIG. 12). In the barrier section 10, the liquid crystal barriers 12A are put into an open state with sufficiently increased light transmittance T thereof, while the liquid crystal barriers 12B are put into a closed state with sufficiently decreased light transmittance T thereof ((D) and (F) of FIG. 12). Then, the backlight 30 turns on (ON) during this timing period of t6 to t7 ((B) of FIG. 12).

Next, during a timing period of t7 to t8, in the display section 20, a display based on the image signal SB is performed as during the timing period of t3 to t4 ((A) of FIG. 12). The barrier driving section 41 applies 0 V as the barrier drive signal DRVA to the liquid crystal barriers 12A, while applying the voltage (−Vo) as the barrier drive signal DRVB to the liquid crystal barriers 12B ((C) and (E) of FIG. 12). As a result, in the barrier section 10, the light transmittance T of the liquid crystal barriers 12A decreases, while the light transmittance T of the liquid crystal barriers 12B increases ((D) and (F) of FIG. 12). At this time, in the liquid crystal layer 19 of the liquid crystal barriers 12B, at the timing t7, since the longitudinal direction of the liquid crystal molecules M does not completely return to the perpendicular direction of the substrate surface, being aligned toward a direction (a certain azimuthal angle direction) slightly inclined from the perpendicular direction, the liquid crystal molecules M fall down from this azimuthal angle direction quickly in response to application of the voltage (−Vo), and the light transmittance T rises quickly. The backlight 30 turns off during this timing period of t7 to t8 ((B) of FIG. 12).

During a timing period of t8 to t9, in the display section 20, a display based on the image signal SB is performed once again as during the timing period of t4 to t5 ((A) of FIG. 12). In the barrier section 10, the liquid crystal barriers 12A are put into a closed state with sufficiently decreased light transmittance T thereof, while the liquid crystal barriers 12B are put into an open state with sufficiently increased light transmittance T thereof ((D) and (F) of FIG. 12). Then, the backlight 30 turns on (ON) during this timing period of t8 to t9 ((B) of FIG. 12).

Subsequently, by repeating the above-described operation during a timing period of t1 to t9, the stereoscopic display unit 1 alternately repeats a display based on the image signal SA (display on the liquid crystal barriers 12A) and a display based on the image signal SB (display on the liquid crystal barriers 12B).

Next, the description is provided on an example of the power startup in the normal display (two-dimensional display) mode.

Figure 13:
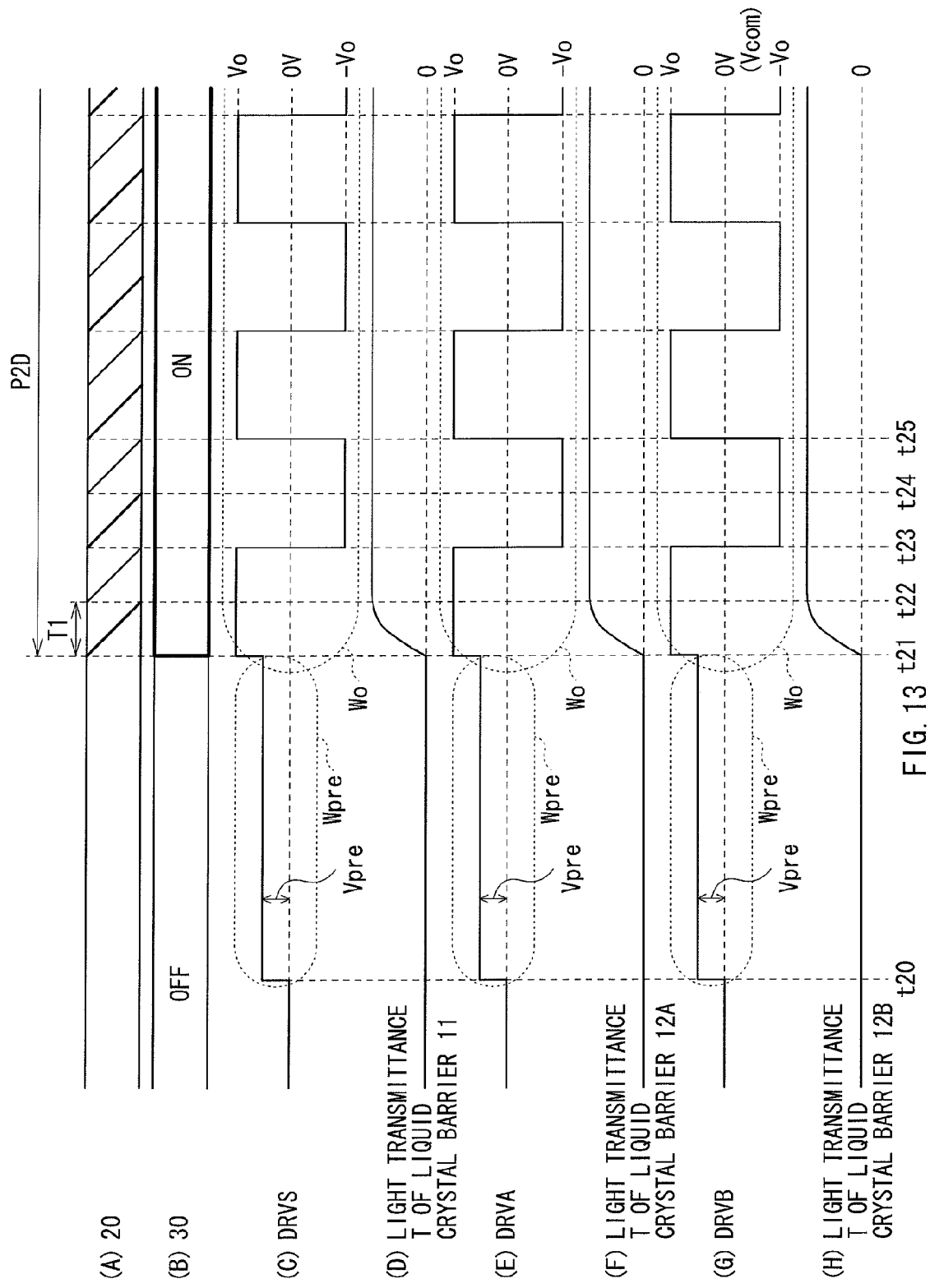
FIG. 13 is a timing waveform diagram showing another operation example of the stereoscopic display unit shown in FIG. 1.

FIG. 13 shows a timing diagram of the normal display operation after power startup (A) of FIG. 13 shows an operation of the display section 20, (B) shows an operation of the backlight 30, (C) shows a waveform of the barrier drive signal DRVS, (D) shows the light transmittance T of the liquid crystal barriers 11, (E) shows a waveform of the barrier drive signal DRVA, (F) shows the light transmittance T of the liquid crystal barriers 12A, (G) shows a waveform of the barrier drive signal DRVB, and (H) shows the light transmittance T of the liquid crystal barriers 12B.

After power startup, during a timing period of t20 to t21, the stereoscopic display unit 1 prepares for a normal display operation, and after the timing t21, the display section 20 and the barrier section 10 operate in synchronization with each other, thereby starting the normal display operation. Hereinafter, the details are described.

First, during the timing period of t20 to t21, the barrier driving section 41 provides the preparatory drive waveform portion Wpre as barrier drive signals DRV to the liquid crystal barriers 11 and 12. Specifically, the barrier driving section 41 provides the preparatory drive waveform portion Wpre as a barrier drive signal DRVS to the liquid crystal barriers 11 ((C) of FIG. 13), and provides the preparatory drive waveform portion Wpre as a barrier drive signal DRVA to the liquid crystal barriers 12A ((E) of FIG. 13), while providing the preparatory drive waveform portion Wpre as a barrier drive signal DRVB to the liquid crystal barriers 12B ((G) of FIG. 13). As a result, in the liquid crystal layer 19 of the liquid crystal barriers 11 and 12 (12A and 12B), the longitudinal direction of the liquid crystal molecules M is aligned to be inclined from the perpendicular direction of the substrate surface. At this time, the light transmittance T of the liquid crystal barriers 11 and 12 remains in a sufficiently low state ((D), (F), and (G) of FIG. 13).

Subsequently, after the timing t21, the normal display operation is started. Specifically, the barrier driving section 41 provides the open drive waveform portion Wo as a barrier drive signal DRV to the liquid crystal barriers 11 and 12, thereby putting the liquid crystal barriers 11 and 12 into an open state, and a viewer sees images displayed on the display section 20 via these liquid crystal barriers 11 and 12.

First, during a timing period of t21 to t22, in the display section 20, the line-sequential scanning is carried out from the uppermost part to the lowermost part on the basis of a drive signal provided from the display driving section 50 to perform a display based on the image signal SS ((A) of FIG. 13). The barrier driving section 41 applies the voltage Vo as the barrier drive signal DRVS to the liquid crystal barriers 11, and applies the voltage Vo as the barrier drive signal DRVA to the liquid crystal barriers 12A, while applying the voltage Vo as the barrier drive signal DRVB to the liquid crystal barriers 12B ((C), (E), and (G) of FIG. 13). As a result, in the barrier section 10, the light transmittance T of the liquid crystal barriers 11 and 12 (12A and 12B) rises ((D), (F), and (H) of FIG. 13). At this time, in the liquid crystal layers 19 of the liquid crystal barriers 11 and 12, since the longitudinal direction of the liquid crystal molecules M is aligned to be inclined from the direction perpendicular to the substrate surface in a preliminary step, the liquid crystal molecules M fall down quickly in response to application of the voltage Vo, and the light transmittance T rises quickly. Then, the backlight 30 turns on (ON) after timing 21 ((B) of FIG. 13).

Subsequently, during a timing period of t22 to t23, in the display section 20, a display based on the image signal SS is performed once again ((A) of FIG. 13). In other words, the stereoscopic display unit 1 displays the same frame image twice repeatedly. In the barrier section 10, the liquid crystal barriers 11 and 12 are put into an open state with sufficiently increased light transmittance T thereof ((D), (F), and (H) of FIG. 13). This allows a viewer to watch a display based on the image signal SS on the display section 20.

Next, during a timing period of t23 to t24, in the display section 20, a display of a subsequent frame image based on the image signal SS is performed ((A) of FIG. 13). The barrier driving section 41 applies a voltage (−Vo) as the barrier drive signal DRVS to the liquid crystal barriers 11, and applies a voltage (−Vo) as the barrier drive signal DRVA to the liquid crystal barriers 12A, while applying a voltage (−Vo) as the barrier drive signal DRVB to the liquid crystal barriers 12B ((C), (E), and (G) of FIG. 13). In the barrier section 10, the light transmittance T of the liquid crystal barriers 11 and 12 (12A and 12B) are kept high. Then, during a timing period of t24 to t25, in the display section 20, a display based on the image signal SS is performed once again ((A) of FIG. 13). In such a manner, the light transmittance T of the liquid crystal barriers 11 and 12 are kept high, which allows a viewer to see a display based on the image signal SS on the display section 20.

Subsequently, by repeating the above-described operation during a timing period of t21 to t25, the stereoscopic display unit 1 carries out a display based on the image signal SS.

Next, the description is provided on an example of a case where a display mode is switched from the stereoscopic display mode to the normal display (two-dimensional display) mode.

Figure 14:
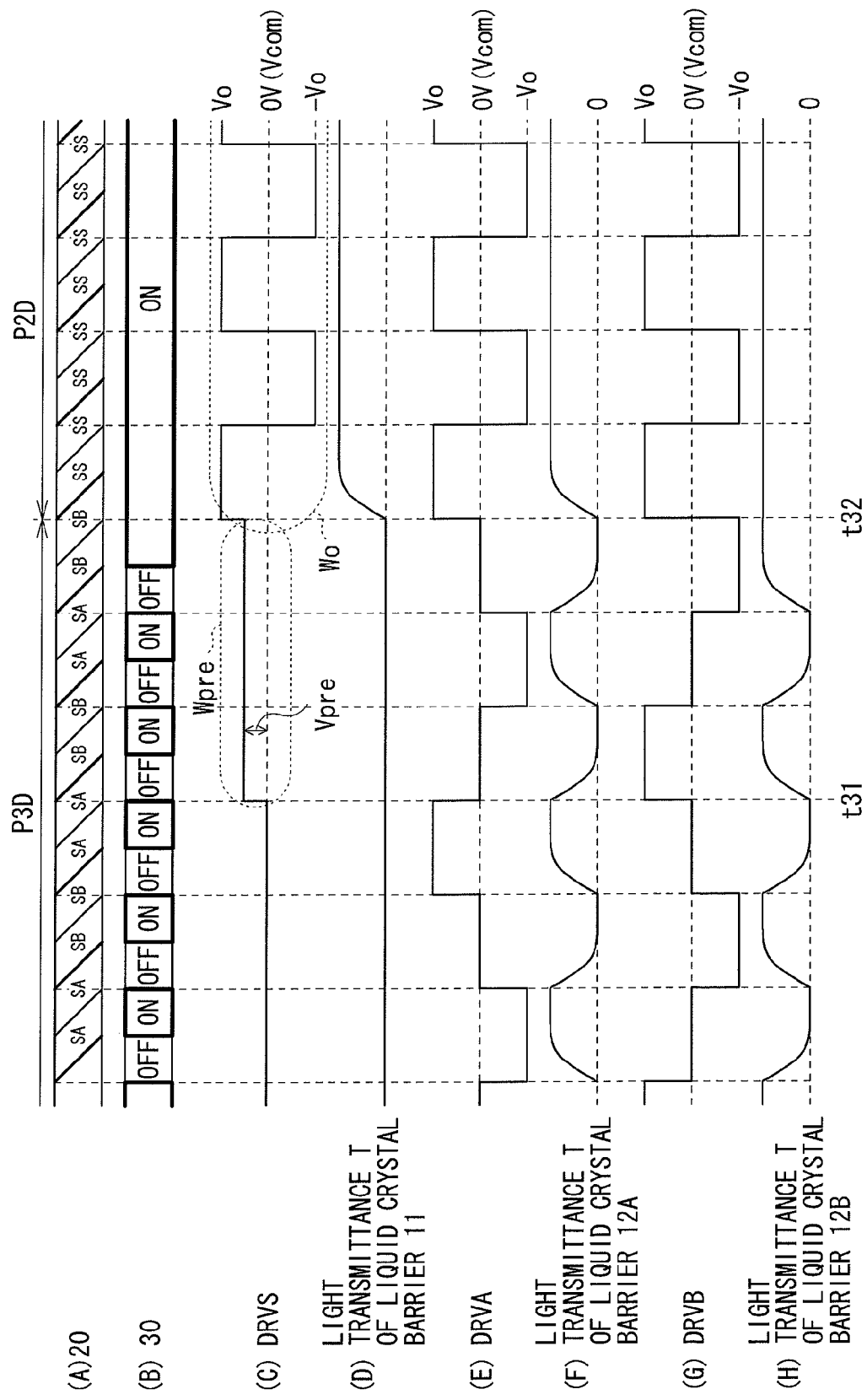
FIG. 14 is a timing waveform diagram showing another operation example of the stereoscopic display unit shown in FIG. 1.

FIG. 14 shows a timing diagram of a display operation in switching a display mode. (A) of FIG. 14 shows an operation of the display section 20, (B) shows an operation of the backlight 30, (C) shows a waveform of the barrier drive signal DRVS, (D) shows the light transmittance T of the liquid crystal barriers 11, (E) shows a waveform of the barrier drive signal DRVA, (F) shows the light transmittance T of the liquid crystal barriers 12A, (G) shows a waveform of the barrier drive signal DRVB, and (H) shows the light transmittance T of the liquid crystal barriers 12B.

For example, when a display mode is switched from the stereoscopic display mode to the normal display (two-dimensional display) mode in accordance with an instruction from a user, the stereoscopic display unit 1 prepares for the normal display during a timing period of t31 to t32, and then starts the normal display (two-dimensional display) after the timing t32. Hereinafter, the details are described.

First, at the timing t31, the barrier driving section 41 provides the preparatory drive waveform portion Wpre as the barrier drive signal DRVS to the liquid crystal barriers 11 ((C) of FIG. 14). As a result, in the liquid crystal layer 19 of the liquid crystal barriers 11, the longitudinal direction of the liquid crystal molecules M is aligned to be inclined from the direction perpendicular to the substrate surface. At this time, the light transmittance T of the liquid crystal barriers 11 remains in a sufficiently low state ((D) of FIG. 14).

Next, at the timing t32, the stereoscopic display unit 1 switches a display mode from the stereoscopic display mode to the normal display mode. In particular, in the display section 20, a display is switched from a display based on the image signals SA and SB to a display based on the image signal SS ((A) of FIG. 14). Then, the barrier driving section 41 applies the voltage Vo as the barrier drive signal DRVS to the liquid crystal barriers 11, and applies the voltage Vo as the barrier drive signal DRVA to the liquid crystal barriers 12A, while applying the voltage Vo as the barrier drive signal DRVB to the liquid crystal barriers 12B ((C), (E), and (G) of FIG. 14). As a result, in the barrier section 10, the light transmittance T of the liquid crystal barriers 11 and 12 (12A and 12B) rises ((D), (F), and (H) of FIG. 14). At this time, in the liquid crystal layers 19 of the liquid crystal barriers 11, since the longitudinal direction of the liquid crystal molecules M is aligned to be inclined from the perpendicular direction of the substrate surface in a preliminary step, the liquid crystal molecules M fall down quickly in response to application of the voltage Vo, and the light transmittance T rises quickly.

As described above, in the stereoscopic display unit 1, the preparatory drive waveform portion Wpre is applied as the barrier drive signal DRV to the liquid crystal barriers 11 and 12 before the liquid crystal barriers 11 and 12 are put into an opening/closing operating state or an open state, thereby enabling the response time of the liquid crystal barriers 11 and 12 to be reduced.

Comparative Example

Next, the description is provided on the action according to the embodiment of the present disclosure as compared with a comparative example. A stereoscopic display unit 1R according to this comparative example is configured with a barrier driving section 41R, which applies no preparatory drive waveform portion Wpre as the barrier drive signal DRV to the liquid crystal barriers 11 and 12 before the liquid crystal barriers 11 and 12 are put into an opening/closing operating state or an open state. Other configurations are similar to those of this embodiment of the present disclosure (FIG. 1).

Figure 15:
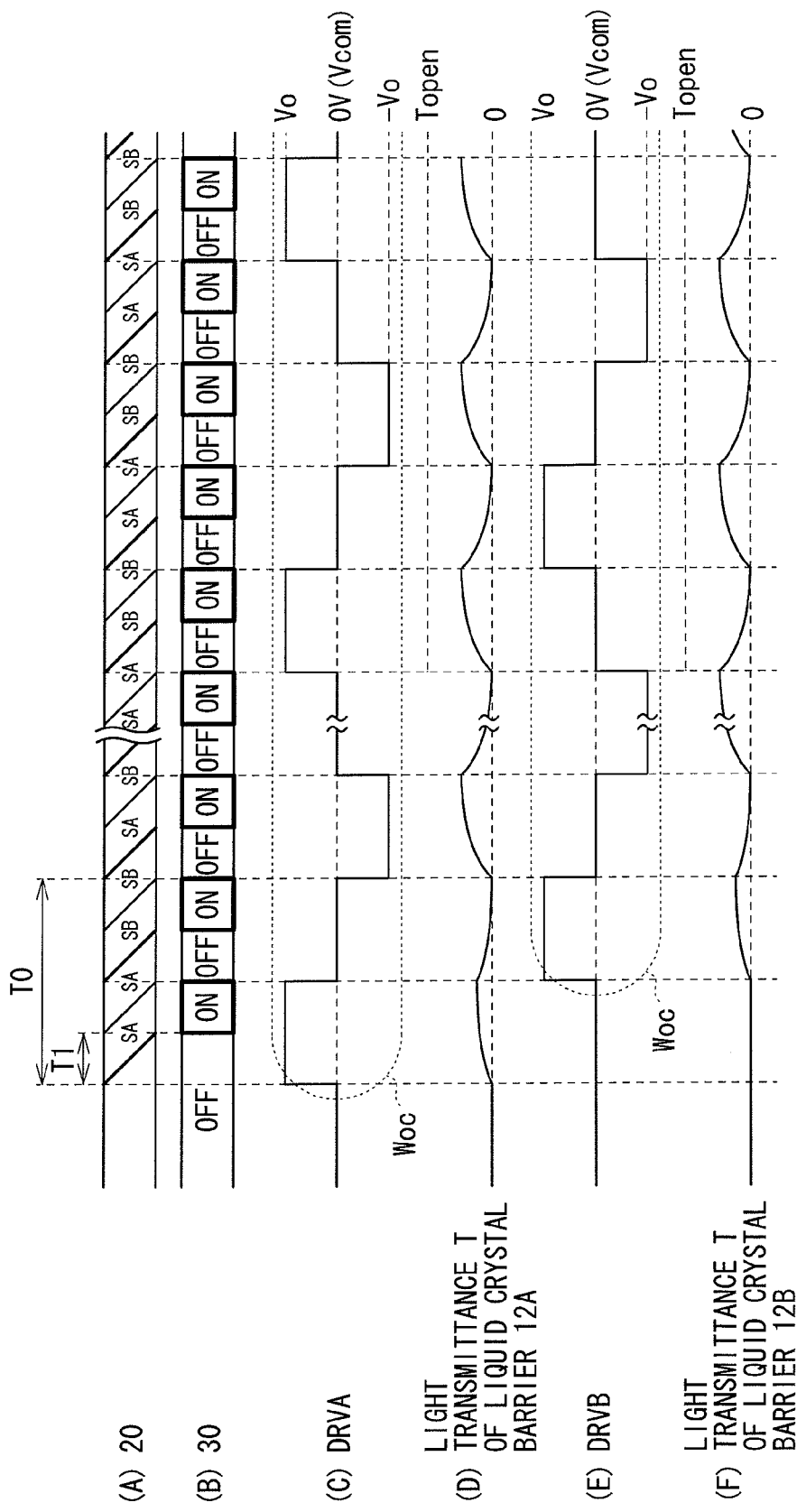
FIG. 15 is a timing waveform diagram showing an operation example of a stereoscopic display unit according to a comparative example.

FIG. 15 shows a timing diagram of the stereoscopic display operation after power startup of the stereoscopic display unit 1R. (A) of FIG. 15 shows an operation of the display section 20, (B) shows an operation of the backlight 30, (C) shows a waveform of the barrier drive signal DRVA, (D) shows the light transmittance T of the liquid crystal barriers 12A, (E) shows a waveform of the barrier drive signal DRVB, and (F) shows the light transmittance T of the liquid crystal barriers 12B. That is, FIG. 15 corresponds to the timing diagram (FIG. 12) of the stereoscopic display unit 1 according to the embodiment of the present disclosure.

In the stereoscopic display unit 1R according to this comparative example, unlike a case of the stereoscopic display unit 1 (FIG. 12), the barrier driving section 41R does not apply the preparatory drive waveform portion Wpre to the liquid crystal barriers 12 after power startup, but applies the opening/closing drive waveform portion Woc. At this time, as each of the liquid crystal molecules M in the liquid crystal barriers 12 is not allowed to fall down quickly in response to the applied voltage, the light transmittance T of the liquid crystal barriers 12 is not permitted to rise quickly. Further, each of the liquid crystal molecules M attempts to respond to the applied voltage with alignment direction thereof being turbulent, which makes it difficult to sufficiently enhance the transmittance T up to the desirable transmittance Topen in the open state.

On the other hand, in the stereoscopic display unit 1 according to the embodiment of the present disclosure, the barrier driving section 41 applies the opening/closing drive waveform portion Woc after applying the preparatory drive waveform portion Wpre to the liquid crystal barriers 12. As a result, in the liquid crystal layer 19 of the liquid crystal barriers 12, the liquid crystal molecules M are allowed to fall down quickly in response to the voltage applied as the opening/closing drive waveform portion Woc after the alignment direction (azimuthal angle) is matched, which allows the liquid crystal barriers 12 to respond in a shorter response time, and allows higher transmittance T to be achieved in the open state.

It is to be noted that, in this example, the description is provided by taking a power startup in the stereoscopic display mode as an example, although this description is also applicable to the power startup in the normal display (two-dimensional display) mode, or switching of a display mode, and in the stereoscopic display unit 1 according to the embodiment of the present disclosure, it is possible to reduce the response time of the liquid crystal barriers 11 and 12.

[Effects]

As described above, according to the embodiment of the present disclosure, the preparatory drive waveform portion is provided, which makes it possible to reduce the response time of the liquid crystal barriers when the open drive waveform portion or the opening/closing drive waveform portion is subsequently applied. Further, this preparatory drive waveform portion reduces turbulence in the alignment direction of the liquid crystal molecules, allowing the transmittance at the time when the liquid crystal barriers are put into an open state to be enhanced.

Further, according to the embodiment of the present disclosure, the liquid crystal molecules are inclined from the perpendicular direction of the substrate surface by applying the preparatory drive waveform portion, which allows manufacturing processes to be simpler as compared with a case where a pre-tilt is provided beforehand using a PSA and the like.

Moreover, according to the embodiment of the present disclosure, no pre-tilt is provided, thereby enabling the contrast to be enhanced. In other words, when the pre-tilt is provided, even if a potential difference at both sides of the liquid crystal layer 19 is 0 V, since the longitudinal direction of the liquid crystal molecules is aligned to be shifted from the perpendicular direction of the substrate surface in some degree, there may be a possibility that the liquid crystal barriers transmit light therethrough slightly, resulting in the contrast being deteriorated in this case. On the other hand, according to the embodiment of the present disclosure, no pre-tilt is provided, thereby enabling the contrast to be enhanced.

In addition, according to the embodiment of the present disclosure, the preparatory drive waveform portion is provided without providing any pre-tilt, which makes it possible to reduce the response time of the liquid crystal molecules. In other words, generally, when the pre-tilt is provided, a force for alignment toward a direction of the pre-tilt is applied to the liquid crystal molecules, which may possibly increase the response time to the applied voltage. On the other hand, according to the embodiment of the present disclosure, no pre-tilt is provided, and the alignment direction of the liquid crystal molecules is matched by applying the preparatory drive waveform portion, thereby enabling the response time of the liquid crystal molecules to be reduced.

Modification Example 1

Figure 16A:
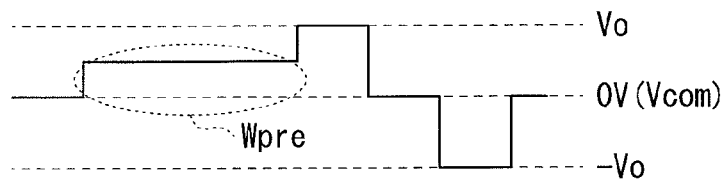
FIGS. 16A to 16G are each a waveform diagram showing a waveform example of a barrier drive signal according to a modification example of the embodiment of the present disclosure.
Figure 16B:
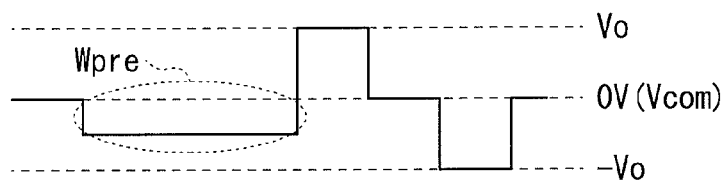
Figure 16C:
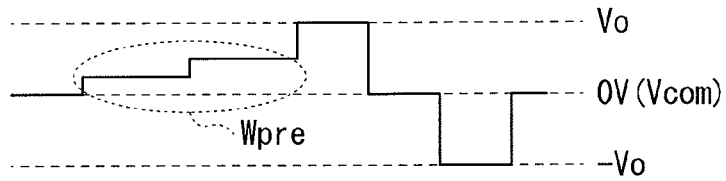
Figure 16D:
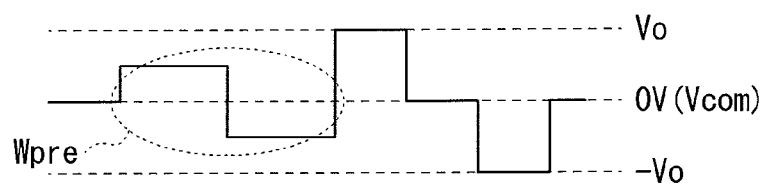
Figure 16E:
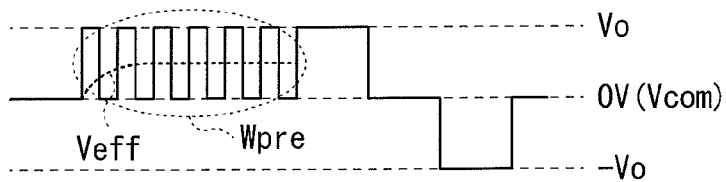
Figure 16F:
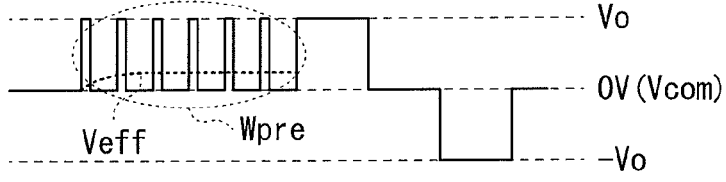
Figure 16G:
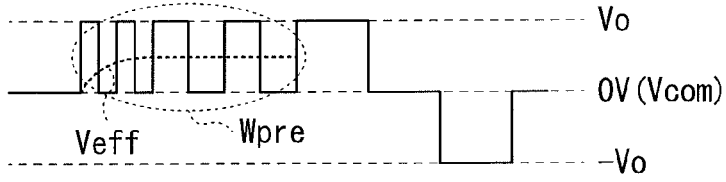

According to the embodiment of the present disclosure, the preparatory drive waveform portion Wpre is a DC waveform having a pre-voltage Vpre, although the Wpre is not limited thereto, and may be, for example, any waveform as shown in FIGS. 16B to 16G in addition to a waveform shown in FIG. 16A described in the above-described embodiment of the present disclosure. For example, the preparatory drive waveform portion Wpre in FIG. 16A may be wholly inverted as shown in FIG. 16B, or the Wpre may be a pulse waveform rising stepwise from 0 V several times (twice in this example) as shown in FIG. 16C, or a part of the preparatory drive waveform portion Wpre (a latter part in this example) in FIG. 16C may be inverted as shown in FIG. 16D. Further, for example, as shown in FIGS. 16E and 16F, the Wpre may be a rectangular waveform transiting between the voltage Vo and 0 V. In this case, an effective voltage Veff that is applied to the liquid crystal layer 19 actually is allowed to be set up using a duty ratio of the rectangular waveform as shown in FIGS. 16E and 16F. In addition, as shown in FIG. 16G, a cycle of the rectangular waveform may be changed on the way.

Further, an average voltage of the preparatory drive waveform portion Wpre may be equal to 0 V (common voltage Vcom) as shown in FIGS. 17A to 17C, for example. In particular, for example, a half of the preparatory drive waveform portion Wpre (a latter half in this example) in FIG. 16A may be inverted as shown in FIG. 17A, or each step of the preparatory drive waveform portion Wpre in FIG. 16C may be inverted on the way as shown in FIG. 17B. Further, for example, a half of the preparatory drive waveform portion Wpre (a latter half in this example) in FIG. 16E may be inverted as shown in FIG. 17C. In such a manner, a part of the preparatory drive waveform portion Wpre is inverted, and the average voltage is made equal to 0 V (common voltage Vcom), thereby makes it possible to reduce the influence of a so-called burning of the liquid crystal layer 19.

Modification Example 2

Figure 18:
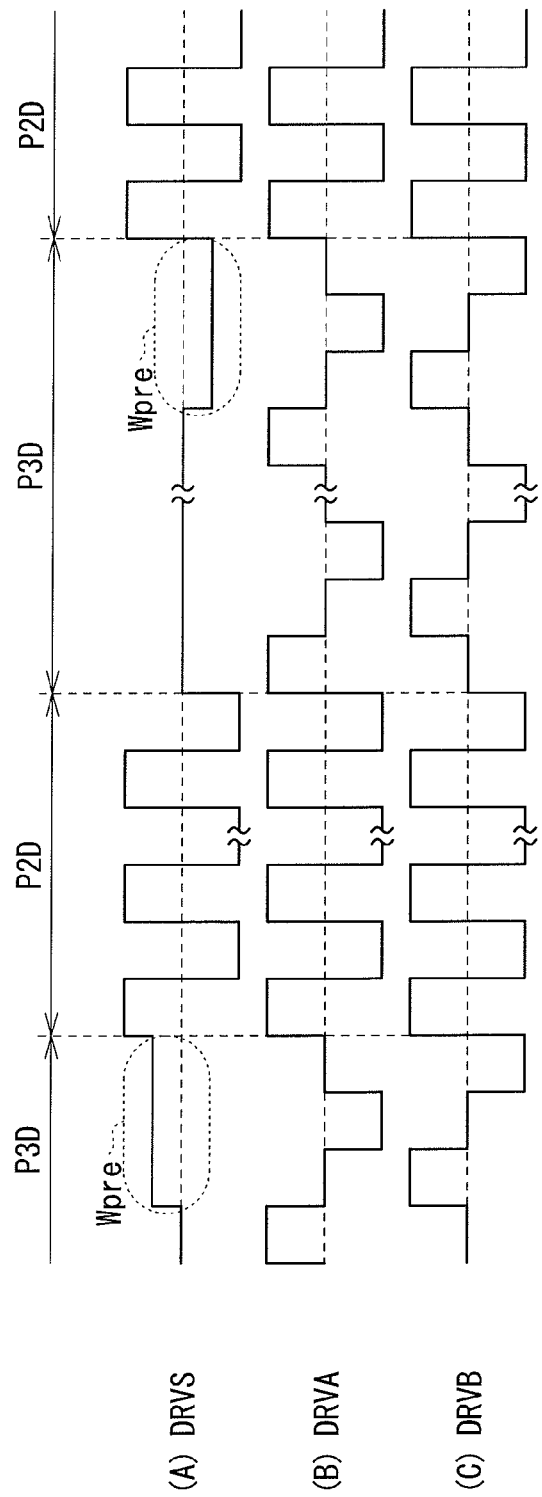
FIG. 18 is a timing waveform diagram showing a waveform example of barrier drive signals according to another modification example of the embodiment of the present disclosure.

Further, according to the above-described embodiment of the present disclosure, the preparatory drive waveform portion Wpre is a same waveform pattern, although the Wpre is not limited thereto, and for example, the polarity thereof may be inverted each time the preparatory drive waveform portion Wpre is applied to the liquid crystal barriers 11 and 12 as shown in FIG. 18. In this example, a display mode is switched several times between the stereoscopic display mode and the normal display (two-dimensional display) mode. In switching a display mode from the stereoscopic display mode to the normal display mode, the barrier driving section 41 provides the preparatory drive waveform portion Wpre as the barrier drive signal DRVS to the liquid crystal barriers 11 as in FIG. 14. At this time, the preparatory drive waveform portion Wpre inverts polarity thereof each time a display mode is switched from the stereoscopic display mode to the normal display mode. In other words, when a positive pre-voltage Vpre is applied as the preparatory drive waveform portion Wpre to the liquid crystal barriers 11, the barrier driving section according to this modification example applies a negative pre-voltage Vpre when applying the preparatory drive waveform portion Wpre next time. This allows to reduce an influence of a so-called burning of the liquid crystal layer 19. It is to be noted that the description is here provided on an example in which the polarity is inverted each time when a display mode is switched, although the example is not limited thereto, and alternatively, the polarity may be inverted each time when power is started up, for example.

Modification Example 3

Figure 19:
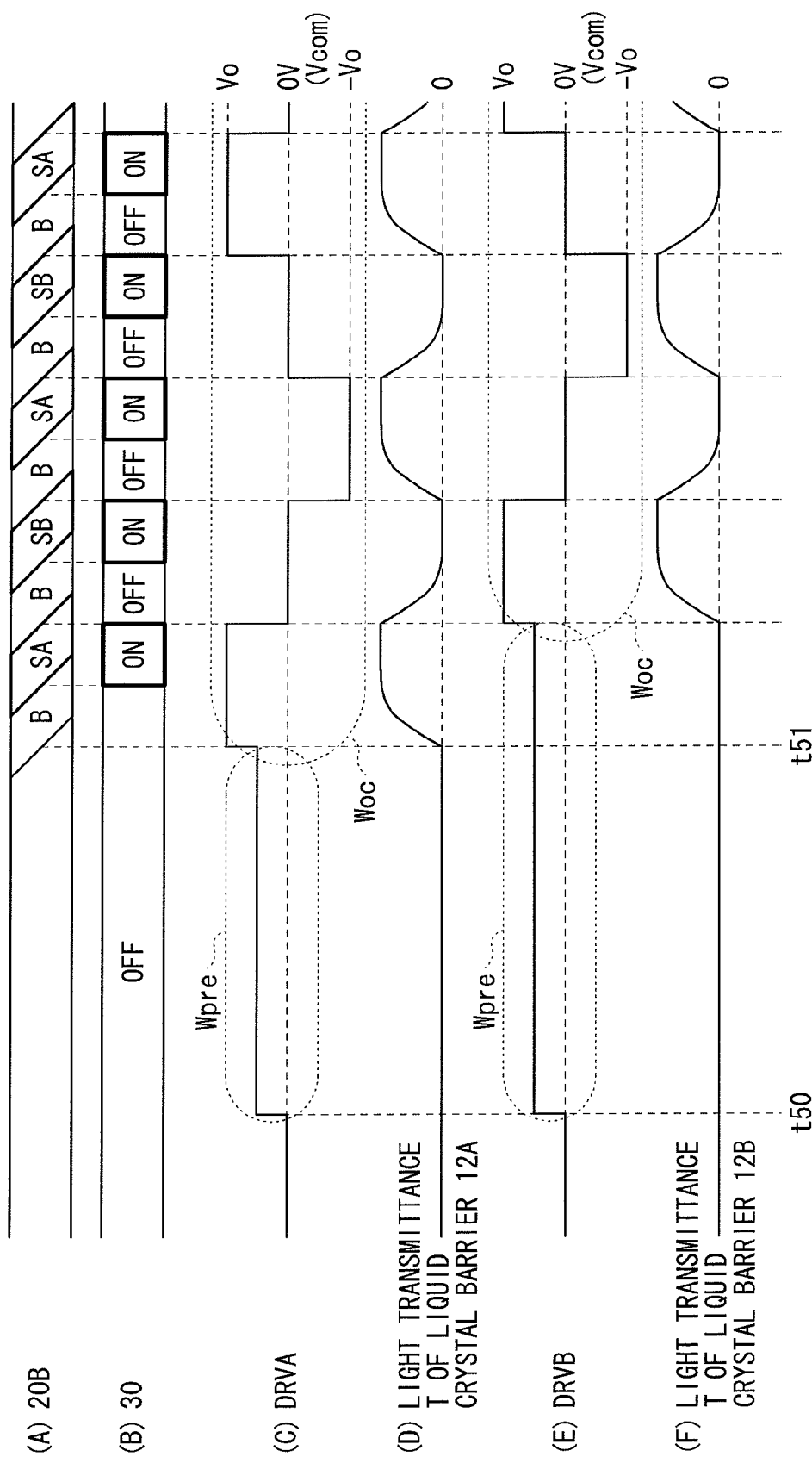
FIG. 19 is a timing waveform diagram showing an operation example of a stereoscopic display unit according to another modification example of the embodiment of the present disclosure.

Further, according to the above-described embodiment and the like of the present disclosure, the same frame image is displayed twice repeatedly, although the display method is not limited thereto, and instead, for example, a black image and a frame image may be displayed alternately as shown in FIG. 19. Here, "B" in (A) of FIG. 19 denotes a state where a black image is displayed. In a stereoscopic display unit 1B according to this modification example, a display section 20B alternately displays a black image B and a frame image based on the image signal SA or SB. Specifically, the display section 20B performs a black image display, a display based on the image signal SA, a black image display, and a display based on the image signal SB in this order repeatedly. Then, the backlight 30 turns on during a period corresponding to a time period when the display section 20B displays a frame image based on the image signal SA or SB. It is to be noted that the description is here provided by taking the stereoscopic display operation as an example, although in the normal display operation, a black image and a frame image may be alternately displayed similarly.

Modification Example 4

Figure 20:
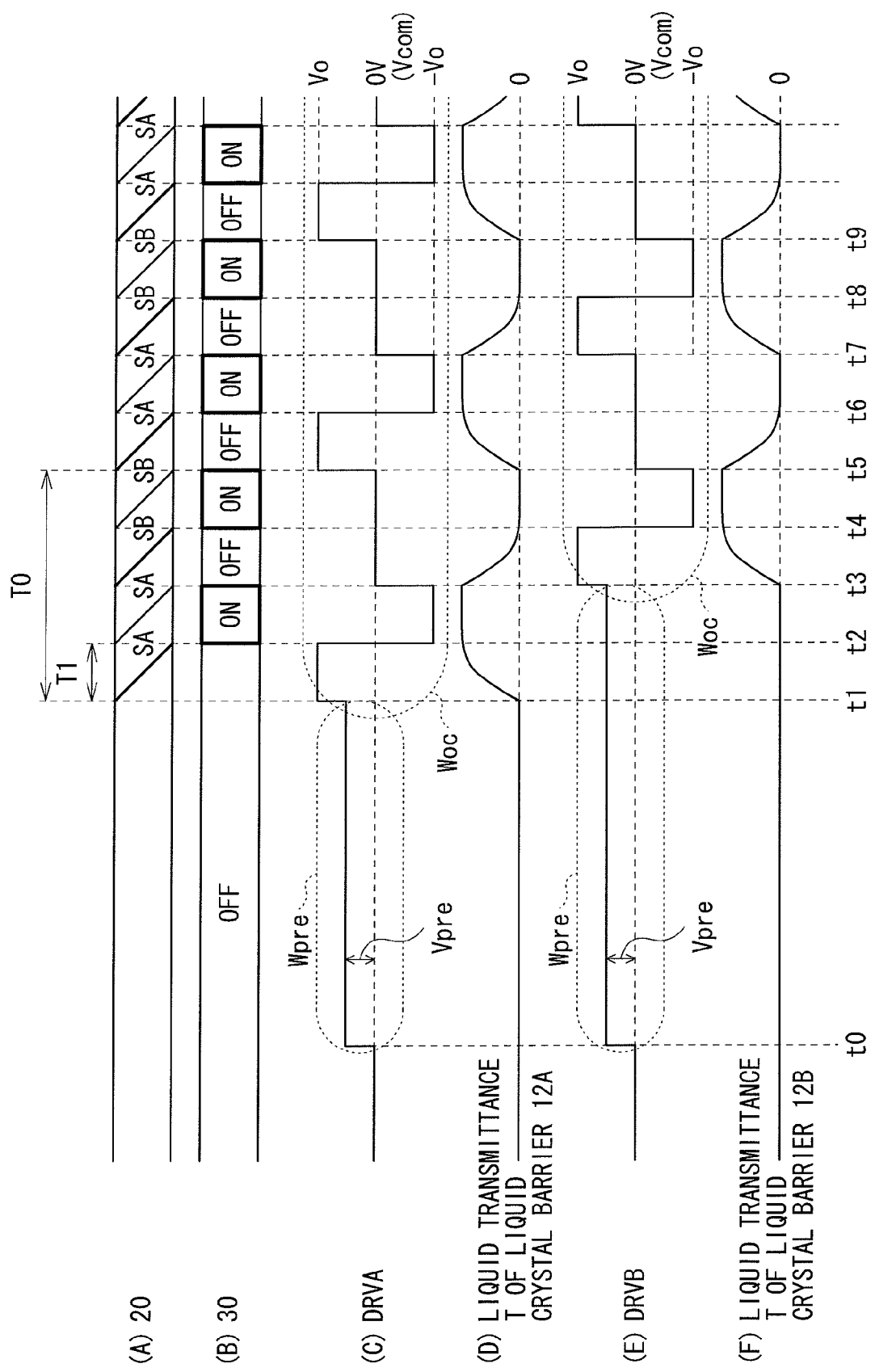
FIG. 20 is a timing waveform diagram showing an operation example of a stereoscopic display unit according to another modification example of the embodiment of the present disclosure.

Further, according to the above-described embodiment and the like of the present disclosure, in a stereoscopic display, the barrier driving section 41 provides either the voltage Vo or the voltage (–Vo) to the liquid crystal barriers 12 (12A and 12B), thereby putting the liquid crystal barriers 12 into an open state. However, a the barrier driving section 41 is not limited thereto, and for example, the liquid crystal barriers 12 may be put into an open state by providing a pulse changing between the voltage Vo and (–Vo) as shown in FIG. 20.

Modification Example 5

Further, according to the above-described embodiment and the like of the present disclosure, in a stereoscopic display, the liquid crystal barriers 12 perform opening/closing operation on a time-division basis. However, the operation is not limited thereto, and alternatively, for example, the liquid crystal barriers 12 may not perform opening/closing operation on a time-division basis, and may always remain in an open state. Hereinafter, the details are described.

Figure 21:
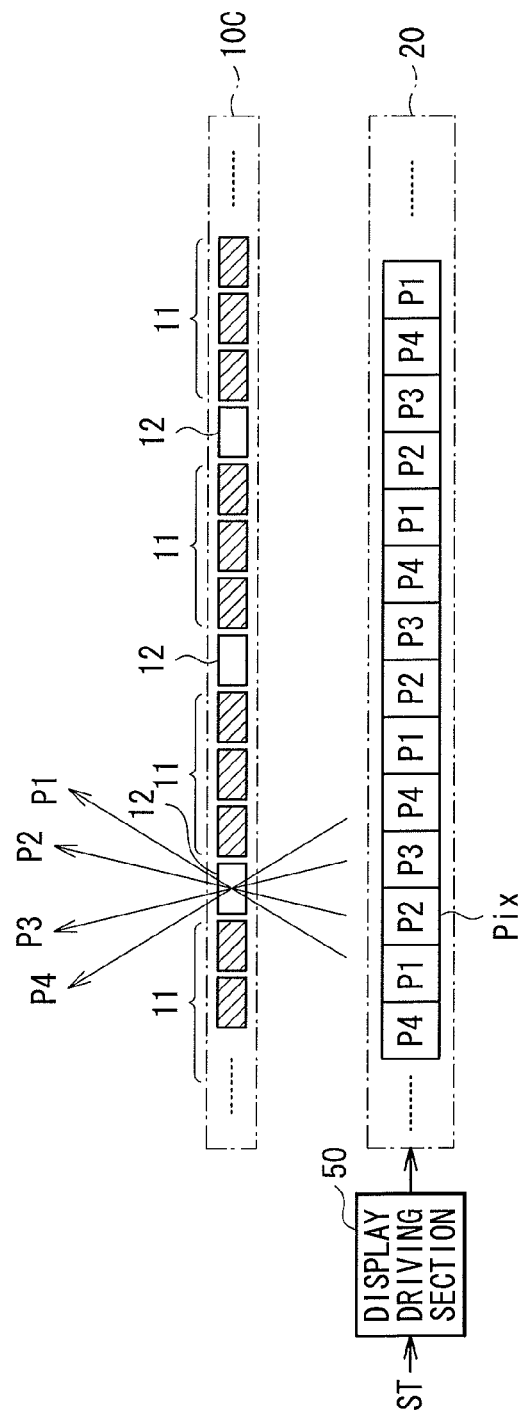
FIG. 21 is a pattern diagram showing an operation example of a stereoscopic display unit according to another modification example of the embodiment of the present disclosure.

FIG. 21 shows an operation example of the stereoscopic display on a stereoscopic display unit 1C according to this modification example. In a barrier section 10C of the stereoscopic display unit 1C, three liquid crystal barriers 11 and one liquid crystal barrier 12 are arranged alternately in this example. In carrying out a stereoscopic display, the liquid crystal barrier 12 is put in an open state, while the liquid crystal barriers 11 are put in a closed state. An image signal ST for the stereoscopic display is provided from a control section 40 to a display driving section 50. Then, a display section 20 displays pixel information P1 to P4 at a position corresponding to the liquid crystal barriers 12 on the basis of the image signal ST.

Figure 22:
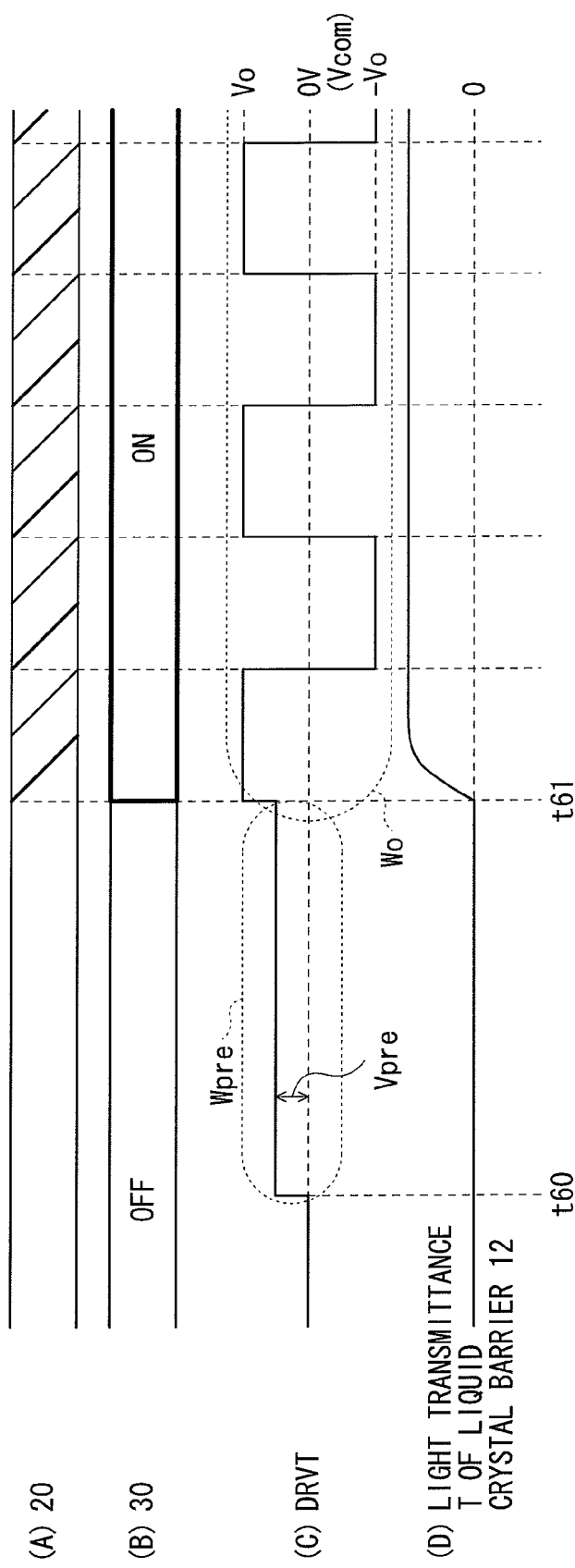
FIG. 22 is a timing waveform diagram showing an operation example of a stereoscopic display unit according to another modification example of the embodiment of the present disclosure.

FIG. 22 shows a timing diagram of the stereoscopic display operation after power startup for the stereoscopic display unit 1C. (A) of FIG. 22 shows an operation of the display section 20 according to this modification example, (B) shows an operation of the backlight 30, (C) shows a waveform of a barrier drive signal DRVT for driving the liquid crystal barrier 12, and (D) shows the light transmittance T of the liquid crystal barrier 12. It is to be noted that a barrier drive signal DRVS is 0 V, and the liquid crystal barriers 11 are put in a closed state (blocking state) in this example. In this example, during a timing period of t60 to t61, the barrier driving section 41 provides the preparatory drive waveform portion Wpre as the barrier drive signal DRVT to the liquid crystal barrier 12. Then, after the timing t61, the barrier driving section 41 provides the open drive waveform portion Wo as the barrier drive signal DRVT to the liquid crystal barrier 12.

Modification Example 6

Figure 23:
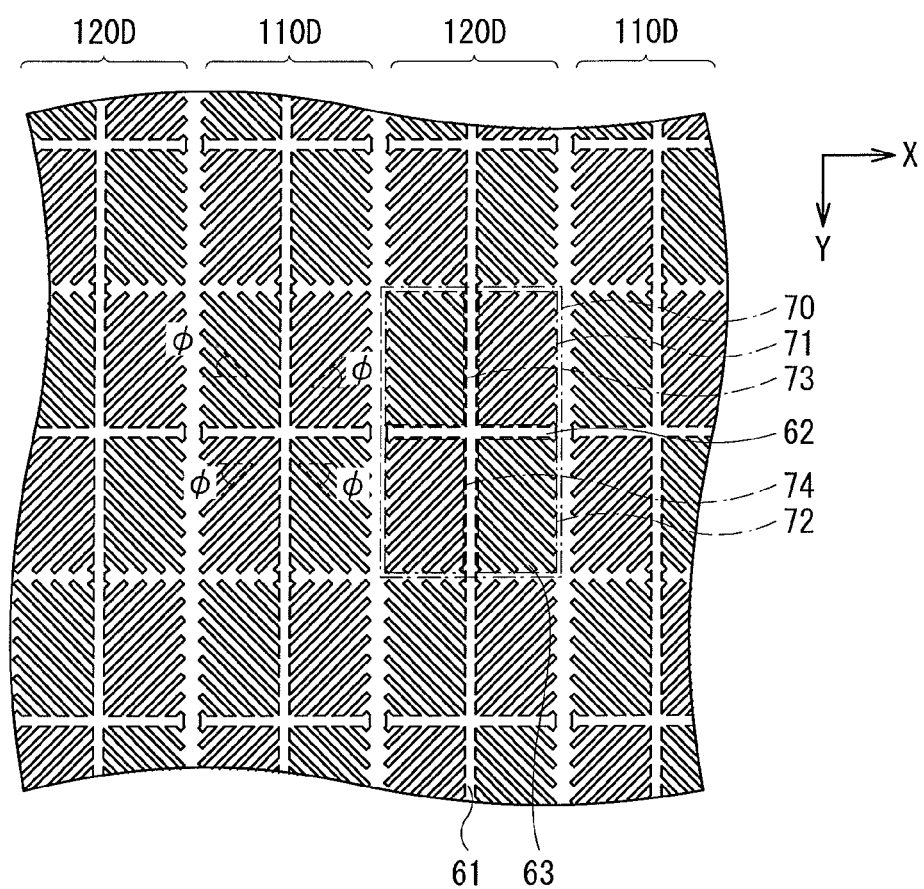
FIG. 23 is an explanatory diagram showing a configuration example of transparent electrodes according to another modification example of the embodiment of the present disclosure.

Further, according to the above-described embodiment and the like of the present disclosure, the liquid crystal barriers 11 and 12 are formed to extend in a direction forming a predetermined angle θ from the vertical direction Y. However, a forming method is not limited thereto, and alternatively, for example, the liquid crystal barriers 11 and 12 may be formed to extend in the vertical direction Y. In this case, transparent electrodes 110D and 120D are formed to extend in the same vertical direction Y as the extending direction of the liquid crystal barriers 11 and 12 as shown in FIG. 23.

Modification Example 7

Figure 24:
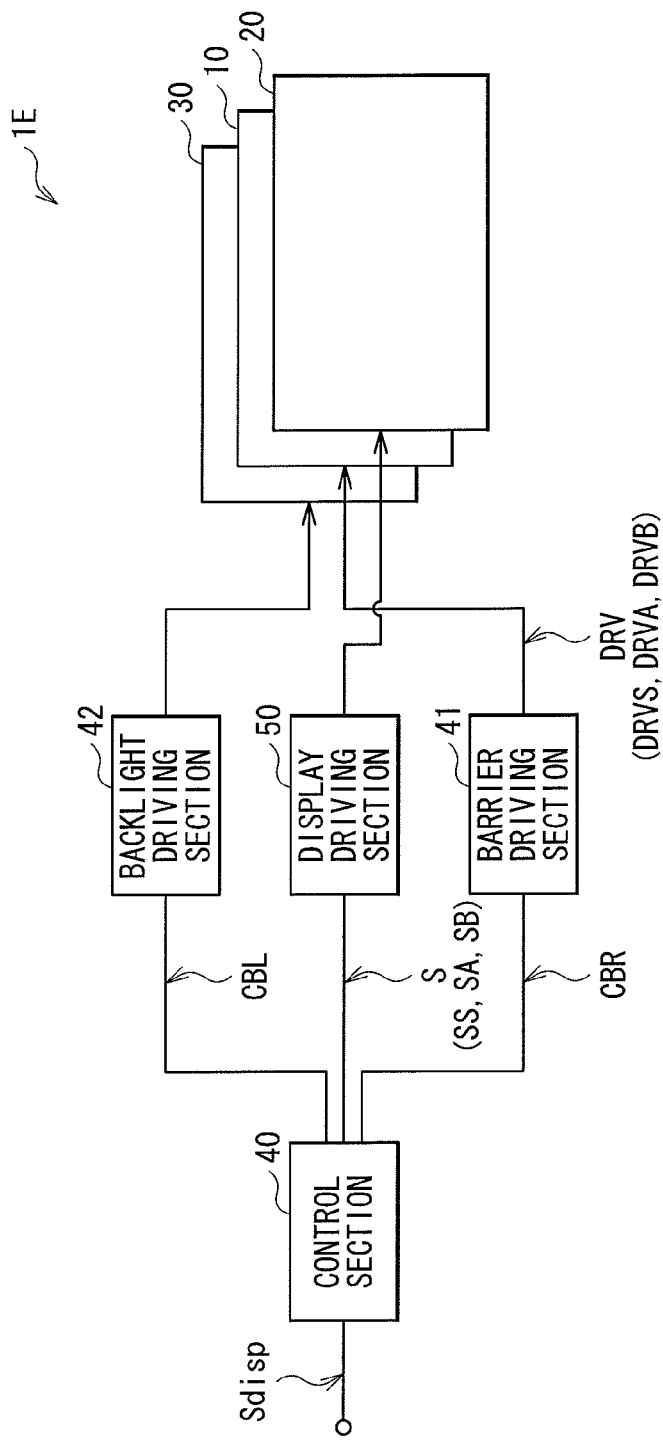
FIG. 24 is a block diagram showing a configuration example of a stereoscopic display unit according to another modification example of the embodiment of the present disclosure.

Further, according to the above-described embodiment and the like of the present disclosure, the backlight 30, the display section 20, and the barrier section 10 are disposed in this order, although the arrangement is not limited thereto. Alternatively, as shown in FIG. 24, the arrangement in the order of the backlight 30, the barrier section 10, and the display section 20 may be applicable.

Figure 25A:
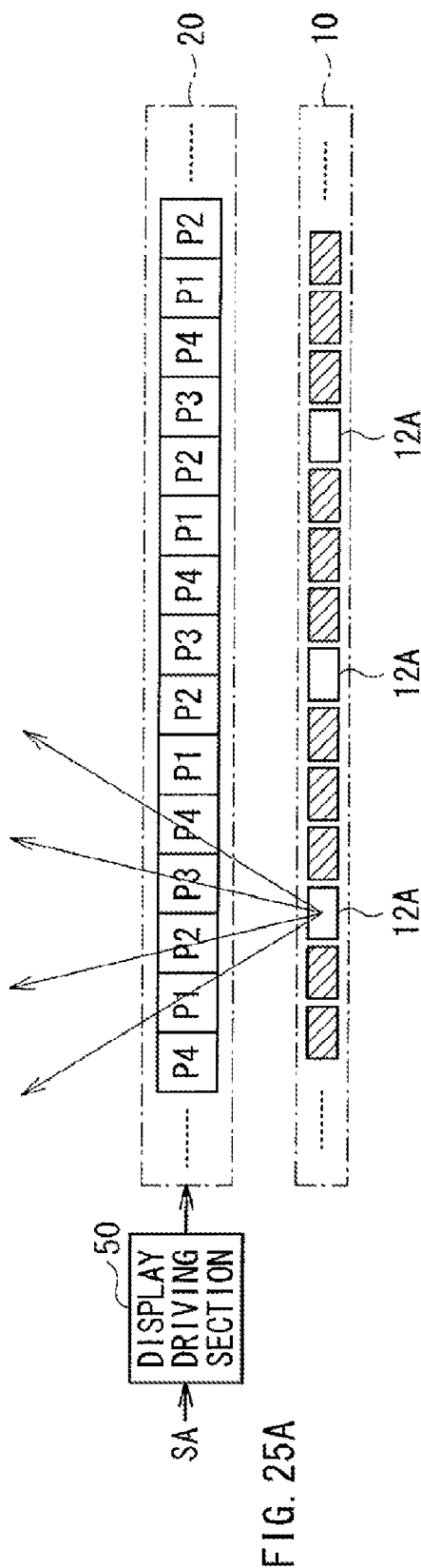
FIG. 25 is a pattern diagram showing an operation example of a stereoscopic display unit according to another modification example of the embodiment of the present disclosure.
Figure 25B:
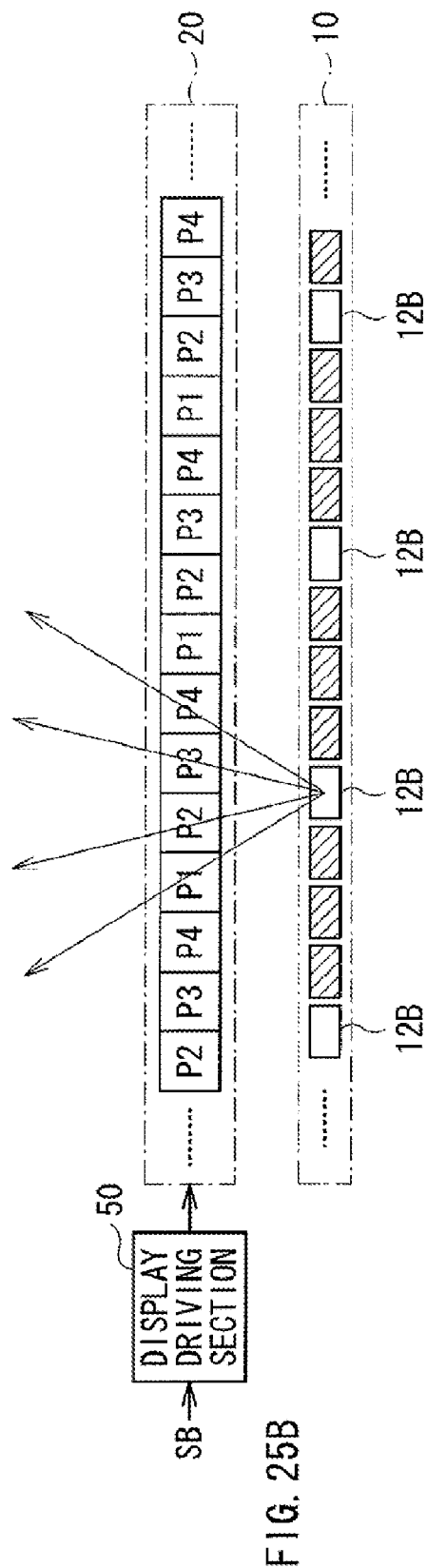

FIGS. 25A and 25B show an operation example of the display section 20 and the barrier section 10 according to this modification example. FIG. 25A shows a case where the image signal SA is provided, while FIG. 25B shows a case where the image signal SB is provided. In this modification example, the light projected from the backlight 30 comes into the barrier section 10 at first. Thereafter, the light transmitting through the liquid crystal barriers 12A and 12B among such light is modulated in the display section 20, while four perspective images being output.

Modification Example 8

Further, according to the above-described embodiment and the like of the present disclosure, the backlight 30 performs a plane emission, although a light emission method is not limited thereto. Alternatively, for example, a backlight having a plurality of sub-emission sections divided in the vertical direction Y may be used, and each of these sub-emission sections may emit light on a time-division basis in synchronization with a display scanning in the display section 20.

The present technology is described hereto by citing the embodiments and modification examples, although the present technology is not limited to those embodiments and the like, and a variety of modifications are available.

For example, according to the above-described embodiment and the like of the present disclosure, during a power startup in the stereoscopic display mode, the barrier driving section 41 begins to provide the preparatory drive waveform portion Wpre to both of the liquid crystal barriers 12A and 12B at the same time as shown in FIG. 12 and the like. However, the operational timing is not limited thereto, and for example, the provision start timing may be shifted alternatively. Similarly, during a power startup in the normal display (two-dimensional display) mode, the barrier driving section 41 begins to provide the preparatory drive waveform portion Wpre to the liquid crystal barriers 11 and 12 (12A and 12B) at the same time as shown in FIG. 13 and the like. However, the operational timing is not limited thereto, and alternatively, for example, the provision start timing may be shifted.

It is possible to achieve at least the following configurations from the above-described example embodiments and the modifications of the disclosure.

(1) A display unit including:
a display section;
a barrier section including a plurality of liquid crystal barriers switching an open state and a closed state; and
a barrier driving section driving the barrier section with one or a plurality of barrier drive signals,
wherein each of the barrier drive signals is a signal including
a first waveform portion being configured of a series of waveforms allowing the liquid crystal barriers to be held in an open state over a plurality of frames, or a second waveform portion being configured of a series of waveforms allowing the liquid crystal barriers to be switched between an open state and a closed state, and
a third waveform portion being located just before the first waveform portion or the second waveform portion and having an average pulse height value smaller than a maximum value of a pulse height value of the first waveform portion or the second waveform portion.

(2) The display unit according to (1) including:
a plurality of display modes including a three-dimensional image display mode and a two-dimensional image display mode,
wherein the barrier section includes a plurality of liquid crystal barriers in a first group and a plurality of liquid crystal barriers in a second group, and the barrier driving section provides the first waveform portion to the liquid crystal barriers in the second group in the two-dimensional image display mode, and provides a direct-current voltage to the liquid crystal barriers in the second group in the three-dimensional image display mode.

(3) The display unit according to (2), wherein the third waveform portion is provided to the liquid crystal barriers in the second group just before mode switching from the three-dimensional image display mode to the two-dimensional image display mode.

(4) The display unit according to (2) or (3), wherein the barrier driving section provides the third waveform portion to the liquid crystal barriers in the second group at a startup time in the two-dimensional image display mode.

(5) The display unit according to any one of (2) to (4), wherein the liquid crystal barriers in the first group are divided into a plurality of barrier sub-groups, and
the barrier driving section provides the first waveform portion to the liquid crystal barriers in the first group in the two-dimensional image display mode, and provides the second waveform portions with phases shifted from each other among barrier sub-groups to the liquid crystal barriers in the first group in the three-dimensional image display mode.

(6) The display unit according to any one of (2) to (4), wherein the barrier driving section provides the first waveform portion to the liquid crystal barriers in the first group in the two-dimensional image display mode and in the three-dimensional image display mode.

(7) The display unit according to any one of (2) to (6), wherein the barrier driving section provides the third waveform portion to the liquid crystal barriers in the first group at a startup time.

(8) The display unit according to any one of (2) to (7), wherein the third waveform portion is a direct-current waveform having a voltage different from the direct-current voltage.

(9) The display unit according to any one of (2) to (7), wherein the third waveform portion is a pulse waveform.

(10) The display unit according to (9), wherein the third waveform portion has a maximum pulse height value equal to a maximum value of a pulse height value of the first waveform portion or the second waveform portion.

(11) The display unit according to any one of (2) to (7), wherein the third waveform portion is a polarity-alternating waveform.

(12) The display unit according to (11), wherein the third waveform portion has a positive-voltage time equal to a negative-voltage time.

(13) The display unit according to any one of (2) to (7), wherein the barrier driving section applies an inverted version of a previously applied third waveform portion in applying the third waveform portion to the liquid crystal barriers.

(14) The display unit according to (1), wherein each of the liquid crystal barriers extends in a first direction and includes a liquid crystal layer and a plurality of sub-electrodes that are arranged side by side in the first direction,
each of the sub-electrodes includes
a first stem portion extending in the first direction,
a second stem portion extending in a direction intersecting with the first stem portion, and
a plurality of branch portions extending in a direction away from both the first stem portion and the second stem portion,
and the plurality of branch portions extend in a same direction within each of a first branch region, a second branch region, a third branch region, and a fourth branch region, the first branch region and the second branch region being disposed on one side of the first stem portion with the second stem portion interposed in between, the third branch region being disposed on an opposite side of the first stem portion from the first branch region, and the fourth branch region being disposed on an opposite side of the first stem portion from the second branch region.

(15) The display unit according to (14) further including:
a first polarizer being provided on one side of the liquid crystal layer and transmitting polarized light in one direction of a vertical direction and a horizontal direction within a display face of the display section; and
a second polarizer being provided on an opposite side of the liquid crystal layer from the first polarizer and transmitting polarized light in the other direction of the vertical direction and the horizontal direction,
wherein branch portions in the first branch region and branch portions in the fourth branch region extend in a direction inclined at about 45 degrees counterclockwise from the horizontal direction, and
branch portions in the second branch region and branch portions in the third branch region extend in a direction inclined at about 45 degrees clockwise from the horizontal direction.

(16) The display unit according to (14), wherein the barrier section includes a common electrode being formed in common over a region corresponding to the plurality of liquid crystal barriers on an opposite side of the liquid crystal layer from the sub-electrodes.

(17) The display unit according to (1) further including:
a backlight, wherein
the display section is a liquid crystal display section, and
the liquid crystal display section is disposed between the backlight and the barrier section.

(18) The display unit according to (1) further including:
a backlight, wherein
the display section is a liquid crystal display section, and
the barrier section is disposed between the backlight and the liquid crystal display section.

(19) A barrier device including:
a barrier section including a plurality of liquid crystal barriers switching an open state and a closed state; and
a barrier driving section driving the barrier section with one or a plurality of barrier drive signals,
wherein each of the barrier drive signals is a signal including
a first waveform portion being configured of a series of waveforms allowing the liquid crystal barriers to be held in an open state over a plurality of frames, or a second waveform portion being configured of a series of waveforms to allowing the liquid crystal barriers to be switched between an open state and a closed state, and
a third waveform portion being located just before the first waveform portion or the second waveform portion and having an average pulse height value smaller than a maximum value of a pulse height value of the first waveform portion or the second waveform portion.

(20) A method of driving a display unit, the method including:
providing one or a plurality of barrier drive signals to a plurality of liquid crystal barriers switching an open state and a closed state; and
displaying images on a display section, wherein
each of the barrier drive signals includes
a first waveform portion being configured of a series of waveforms allowing the liquid crystal barriers to be held in an open state over a plurality of frames, or a second waveform portion being configured of a series of waveforms allowing the liquid crystal barriers to be switched between an open state and a closed state, and
a third waveform portion being located just before the first waveform portion or the second waveform portion and having an average pulse height value smaller than a maximum value of a pulse height value of the first waveform portion or the second waveform portion.

The present disclosure contains subject matter related to that disclosed in Japanese Priority Patent Application JP 2011-113894 filed in the Japan Patent Office on May 20, 2011, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:
1. A display unit comprising:
a display section;
a barrier section comprising a plurality of liquid crystal barriers switching between an open state and a closed state; and
a barrier driving section driving the barrier section with one or more barrier drive signals,
wherein each of the one or more barrier drive signals comprises:
a first waveform portion comprising a series of waveforms that cause the plurality of liquid crystal barriers to be held in the open state, or
a second waveform portion comprising a series of waveforms that cause the plurality of liquid crystal barriers to be switched between the open state and the closed state; and
a third waveform portion located before the first waveform portion or the second waveform portion with respect to time, wherein the third waveform portion comprises a preparatory waveform that causes an alignment direction of each of a plurality of liquid crystal molecules in the plurality of liquid crystal barriers to be matched with each other without using pre-tilt.

2. The display unit according to claim 1,
wherein the barrier section comprises a first plurality of liquid crystal barriers in a first group and a second plurality of liquid crystal barriers in a second group, and the barrier driving section provides the first waveform portion to the second plurality of liquid crystal barriers in the second group in a two-dimensional image display mode, and provides a direct-current voltage to the second plurality of liquid crystal barriers in the second group in a three-dimensional image display mode.

3. The display unit according to claim 2, wherein the third waveform portion is provided to the second plurality of liquid crystal barriers in the second group before mode switching from the three-dimensional image display mode to the two-dimensional image display mode.

4. The display unit according to claim 2, wherein the barrier driving section provides the third waveform portion to the second plurality of liquid crystal barriers in the second group at a startup time in the two-dimensional image display mode.

5. The display unit according to claim 2, wherein the first plurality of liquid crystal barriers in the first group are divided into a plurality of barrier sub-groups, and the barrier driving section provides the first waveform portion to the first plurality of liquid crystal barriers in the first group in the two-dimensional image display mode, and provides the second waveform portion with phases shifted from each other among the plurality of barrier sub-groups to the first plurality of liquid crystal barriers in the first group in the three-dimensional image display mode.

6. The display unit according to claim 2, wherein the barrier driving section provides the first waveform portion to the first plurality of liquid crystal barriers in the first group in the two-dimensional image display mode and in the three-dimensional image display mode.

7. The display unit according to claim 2, wherein the barrier driving section provides the third waveform portion to the first plurality of liquid crystal barriers in the first group at a startup time.

8. The display unit according to claim 2, wherein the third waveform portion is a direct-current waveform having a voltage different from the direct-current voltage.

9. The display unit according to claim 1, wherein the third waveform portion is a pulse waveform.

10. The display unit according to claim 9, wherein the third waveform portion has a maximum pulse height value equal to a maximum value of a pulse height value of the first waveform portion or the second waveform portion.

11. The display unit according to claim 1, wherein the third waveform portion is a polarity-alternating waveform, wherein the third waveform portion has a positive-voltage time equal to a negative-voltage time.

12. The display unit according to claim 1, wherein the barrier driving section applies an inverted version of a previously applied third waveform portion in applying the third waveform portion to the plurality of liquid crystal barriers.

13. The display unit according to claim 1, wherein each of the plurality of liquid crystal barriers extends in a first direction and comprises:
 a liquid crystal layer and a plurality of sub-electrodes that are arranged side by side in the first direction, each of the plurality of sub-electrodes comprises:
  a first stem portion extending in the first direction, a second stem portion extending in a direction intersecting with the first stem portion, and a plurality of branch portions extending in a direction away from both the first stem portion and the second stem portion, and the plurality of branch portions extend in a same direction within each of a first branch region, a second branch region, a third branch region, and a fourth branch region, the first branch region and the second branch region being disposed on one side of the first stem portion with the second stem portion interposed in between, the third branch region being disposed on an opposite side of the first stem portion from the first branch region, and the fourth branch region being disposed on an opposite side of the first stem portion from the second branch region.

14. The display unit according to claim 13, further comprising:
 a first polarizer provided on one side of the liquid crystal layer and configured to transmit polarized light in one of a vertical direction or a horizontal direction within a display face of the display section, and
 a second polarizer provided on an opposite side of the liquid crystal layer from the first polarizer and configured to transmit polarized light in other of the vertical direction or the horizontal direction,
 wherein branch portions in the first branch region and branch portions in the fourth branch region extend in a direction inclined at about 45 degrees counterclockwise from the horizontal direction, and branch portions in the second branch region and branch portions in the third branch region extend in a direction inclined at about 45 degrees clockwise from the horizontal direction.

15. The display unit according to claim 13, wherein the barrier section comprises a common electrode being formed in common over a region corresponding to the plurality of liquid crystal barriers on an opposite side of the liquid crystal layer from the plurality of sub-electrodes.

16. The display unit according to claim 1, further comprising:
 a backlight, wherein the display section is a liquid crystal display section, and the liquid crystal display section is disposed between the backlight and the barrier section.

17. The display unit according to claim 1, further comprising:
 a backlight, wherein the display section is a liquid crystal display section, and the barrier section is disposed between the backlight and the liquid crystal display section.

18. The display unit according to claim 1, wherein the plurality of liquid crystal barriers are formed to extend toward a predetermined oblique direction such that the preparatory waveform prepares the plurality of liquid crystal barriers to be switched between the open state and the closed state.

19. A barrier device comprising:
 a barrier section comprising a plurality of liquid crystal barriers switching between an open state and a closed state; and
 a barrier driving section driving the barrier section with one or more barrier drive signals,
 wherein each of the one or more barrier drive signals comprises:
  a first waveform portion comprising a series of waveforms that cause the plurality of liquid crystal barriers to be held in the open state, or
  a second waveform portion comprising a series of waveforms that cause the plurality of liquid crystal barriers to be switched between the open state and the closed state; and
  a third waveform portion located before the first waveform portion or the second waveform portion with respect to time, wherein the third waveform portion comprises a preparatory waveform that causes an alignment direction of each of a plurality of liquid crystal molecules in the plurality of liquid crystal barriers to be matched with each other without using pre-tilt.

20. A method of driving a display unit, the method comprising:
 providing one or more barrier drive signals to a plurality of liquid crystal barriers switching between an open state and a closed state, wherein each of the barrier drive signals comprises:
  a first waveform portion comprising a series of waveforms that cause the plurality of liquid crystal barriers to be held in the open state, or
  a second waveform portion comprising a series of waveforms that cause the plurality of liquid crystal barriers to be switched between the open state and the closed state; and
  a third waveform portion located before the first waveform portion or the second waveform portion with respect to time, wherein the third waveform portion comprises a preparatory waveform that causes an alignment direction of each of a plurality of liquid crystal molecules in the plurality of liquid crystal barriers to be matched with each other without using pre-tilt.

* * * * *